(12) United States Patent
Kramer et al.

(10) Patent No.: US 10,909,610 B1
(45) Date of Patent: Feb. 2, 2021

(54) METHOD, SYSTEM AND COMPUTER-READABLE MEDIUM FOR AUTOMATIC REPLENISHMENT OF ITEMS UTILIZING A SENSOR-BASED DEVICE

(71) Applicant: Amazon Technologies, Inc., Seattle, WA (US)

(72) Inventors: Allison Kramer, Seattle, WA (US); Kara Lillian Cavallaro, Seattle, WA (US); Samuel Stevens Heyworth, Seattle, WA (US); Devon Merritt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 172 days.

(21) Appl. No.: 15/927,946

(22) Filed: Mar. 21, 2018

(51) Int. Cl.
  *G06Q 30/00* (2012.01)
  *G06Q 30/06* (2012.01)

(52) U.S. Cl.
  CPC .............................. *G06Q 30/0633* (2013.01)

(58) Field of Classification Search
  None
  See application file for complete search history.

(56) References Cited

U.S. PATENT DOCUMENTS

| | | | |
|---|---|---|---|
| 5,168,445 | A | 12/1992 | Kawashima et al. |
| 5,235,509 | A | 8/1993 | Mueller et al. |
| 6,204,763 | B1 | 3/2001 | Sone |
| 8,260,672 | B2 | 9/2012 | Weel et al. |
| 8,718,620 | B2 | 5/2014 | Rosenblatt |
| 9,267,834 | B2 | 2/2016 | Chowdhary et al. |
| 9,619,831 | B1 | 4/2017 | Kumar et al. |
| 10,360,617 | B2 | 7/2019 | High et al. |
| 10,438,276 | B2 | 10/2019 | Godsey et al. |
| 10,445,672 | B2 | 10/2019 | Renfroe |

(Continued)

FOREIGN PATENT DOCUMENTS

| | | |
|---|---|---|
| WO | 2016149674 | 9/2016 |
| WO | 2017118845 | 7/2017 |

OTHER PUBLICATIONS

U.S. Appl. No. 15/696,040, U.S. Patent Application, titled "Sensor Data-Based Reordering of Items," filed Sep. 5, 2017.

(Continued)

*Primary Examiner* — Marissa Thein
*Assistant Examiner* — Ashley D Preston
(74) *Attorney, Agent, or Firm* — Kilpatrick Townsend & Stockton LLP

(57) ABSTRACT

Utilizing the disclosed techniques, automatic item replenishment decisions may be made based on whether or not an item entirely fits on/in an automatic replenishment device (ARD). For example, sensor data associated with an item and an ARD may be received. The sensor data may indicate that an initial amount of the item is in contact with the ARD. A measurement value may be calculated that quantifies the initial amount of the item that is in contact with the ARD. Subsequent sensor updates may be monitored to determine various amounts of the item that are in contact with the ARD. Based at least in part on the measurement value and the monitoring, it may be determined that a surplus amount of the item exists that is external to the ARD. Decisions on whether to generate an automated order for the item may be based on the existence of the surplus amount.

17 Claims, 12 Drawing Sheets

(56) References Cited

U.S. PATENT DOCUMENTS

| | | | |
|---|---|---|---|
| 10,445,819 | B2 | 10/2019 | Renfroe |
| 10,474,987 | B2* | 11/2019 | Corona .................. F25D 29/00 |
| 2006/0206373 | A1 | 9/2006 | Blair et al. |
| 2007/0162326 | A1 | 7/2007 | Weel et al. |
| 2008/0113614 | A1 | 5/2008 | Rosenblatt |
| 2010/0076903 | A1 | 3/2010 | Klingenberg et al. |
| 2011/0153466 | A1 | 6/2011 | Harish et al. |
| 2012/0038456 | A1* | 2/2012 | Pikkarainen ......... G08B 13/181 340/5.61 |
| 2013/0038455 | A1 | 2/2013 | Chowdhary et al. |
| 2014/0095479 | A1 | 4/2014 | Chang et al. |
| 2014/0203040 | A1 | 7/2014 | Clark et al. |
| 2015/0178654 | A1 | 6/2015 | Glasgow et al. |
| 2015/0186836 | A1 | 7/2015 | Chouhan et al. |
| 2015/0278912 | A1 | 10/2015 | Melcher et al. |
| 2015/0302510 | A1 | 10/2015 | Godsey et al. |
| 2015/0329260 | A1* | 11/2015 | Singh .................... B65D 79/00 705/28 |
| 2016/0019780 | A1 | 1/2016 | Gettings et al. |
| 2016/0040580 | A1 | 2/2016 | Khaled et al. |
| 2016/0132821 | A1 | 5/2016 | Glasgow et al. |
| 2016/0203431 | A1 | 7/2016 | Renfroe |
| 2016/0314514 | A1 | 10/2016 | High et al. |
| 2016/0347540 | A1 | 12/2016 | Skocypec et al. |
| 2017/0201057 | A1 | 7/2017 | Ahlawat et al. |
| 2017/0300984 | A1 | 10/2017 | Hurwich |
| 2018/0053140 | A1 | 2/2018 | Baca et al. |
| 2018/0164143 | A1 | 6/2018 | Gurumohan et al. |
| 2018/0165627 | A1 | 6/2018 | Jones et al. |
| 2018/0260779 | A1 | 9/2018 | Singh et al. |
| 2018/0308514 | A1 | 10/2018 | Li et al. |
| 2019/0108483 | A1* | 4/2019 | Tineo ................. G06Q 10/0875 |
| 2020/0105409 | A1 | 4/2020 | Kochar et al. |

OTHER PUBLICATIONS

U.S. Appl. No. 15/918,205, U.S. Patent Application, titled "Managing Shipments Based on Data From a Sensor-Based Automatic Replenishment Device," filed Mar. 12, 2018.

U.S. Appl. No. 15/926,779, U.S. Patent Application, titled "Product Specific Correction For a Sensor-Based Device," filed Mar. 20, 2018.

U.S. Appl. No. 15/927,324, U.S. Patent Application, titled "Managing Electronic Requests Associated With Items Stored by Automatic Replenishment Devices," filed Mar. 21, 2018.

U.S. Appl. No. 15/927,990, U.S. Patent Application, titled "Order Quantity and Product Recommendations Based on Sensor Data," filed Mar. 21, 2018.

U.S. Appl. No. 15/927,998, U.S. Patent Application, titled "Predictive Consolidation System Based on Sensor Data," filed Mar. 21, 2018.

U.S. Appl. No. 15/928,370, U.S. Patent Application, titled "Product and Lid Identification for Sensor-Based Device," filed Mar. 22, 2018.

U.S. Appl. No. 15/928,409, U.S. Patent Application, titled "LED Enhanced Product and Lid Identification for Sensor-Based Device," filed Mar. 22, 2018.

U.S. Appl. No. 15/934,780, U.S. Patent Application, titled "Test-Enabled Measurements for a Sensor-Based Device," filed Mar. 23, 2018.

U.S. Appl. No. 15/963,761, U.S. Patent Application, titled "Sensor-Related Improvements to Automatic Replenishment Devices," filed Apr. 26, 2018.

Griffiths, "Never Run Out of Food Again! Smart Mat Warns You When You're Low on Milk While Fridge Cam Lets you Remotely Check What you Already Have During your Weekly Shop," Available online at http://www.dailymail.co.uk/sciencetech/article-3385278/Never-run-food-Smart-mat-tells-low-milk-fridge-cam-shows-s-inside-shopping.html, Jan. 5, 2016, 8 pages.

"Amazon Dash Replenishment", XP054979477, Available online at: https://www.youtube.com/watch?v=vTYcWG6BIDY, Jan. 19, 2016, 3 pages.

"Amazon Dash Replenishment for Developers", XP054979476, Available online at: https://www.youtube.com/watch?v=WS42WcuSyVU, Jan. 30, 2017, 5 pages.

"Dash Replenishment Service CX Guidelines", Dash Replenishment Service, XP055598411, Available online at: https://web.archive.org/web/20171208012109/https://developer.amazon.com/docs/dash/customer-experience-guidelines.html, Dec. 8, 2017, 9 pages.

"Dash Replenishment Service Glossary", Dash Replenishment Service, XP055598456, Available online at: https://web.archive.org/web/20171208041422/https://developer.amazon.com/docs/dash/glossary.html, Dec. 8, 2017, 6 pages.

"Frequently Asked Questions", Dash Replenishment Service, XP055598417, Available online at: https://web.archive.org/web/20171208012934/https://developer.amazon.com/docs/dash/faqs.html, Dec. 8, 2017, 5 pages.

"GetOrderinfo Endpoint", Dash Replenishment Service, XP055598458, Available online at: https://web.archive.org/web/20171208041609/https://developer.amazon.com/docs/dash/getorderinfo-endpoint.html, Dec. 8, 2017, 6 pages.

"Notification Messages (DRS)", Dash Replenishment Service, XP055598457, Available online at: https://web.archive.org/web/20171208041525/https://developer.amazon.Gom/docs/dash/notification-messages.html, Dec. 8, 2017, 14 pages.

"SlotStatus Endpoint", Dash Replenishment Service, XP055598461, Available online at: https://web.archive.org/web/20171208041548/https://developer.amazon.com/docs/dash/slotstatus-endpoint.html, Dec. 8, 2017, 7 pages.

PCT/US2019/022215 , "International Search Report and Written Opinion", dated Apr. 29, 2019, 11 pages.

"Amazon Dash Replacement for Developers", Youtube, Available Online at: https://www.youtube.com/watch?v=WS42WcuSyVU, Jan. 30, 2017, 4 pages.

Li et al., "Discussion of Principle and Application for Internet of Things", Applied Mechanics and Materials, vol. 347-350, 2013, pp. 3322-3325.

Welch et al., "Seven Keys to ERP Success", Strategic Finance, vol. 89, No. 3, Institute of Management Accountants, Sep. 2007, pp. 41-61.

* cited by examiner

METHOD, SYSTEM AND COMPUTER-READABLE MEDIUM FOR AUTOMATIC REPLENISHMENT OF ITEMS UTILIZING A SENSOR-BASED DEVICE

BACKGROUND

Automatic replenishment devices (ARDs) allow a user to receive updates about an item by associating the device with the item and identifying a user device (e.g., a mobile phone number). Over time, an ARD may alert to the user device about measurements related to the item. Conventionally, as a customer depletes a supply of an item, or nearly depletes the supply, the customer may place a new order for more supply of the product by interacting with an online retailer to order more supply. Additionally, or alternatively, the online retailer may offer a subscription service that can deliver additional amounts on a periodic basis. In both cases, a back-end system of the online retailer allocates a delivery resource to the user and schedules delivery of the additional item amount.

However, the integration between measurements generated by the ARD and the back-end system is typically limited. Generally, usage of delivery resources across the user base is not optimized or managed based on the measurement data of ARDs. Thus, conventional techniques for item replenishment include inefficiencies and inaccuracies which make accurate item replenishment difficult.

BRIEF DESCRIPTION OF THE DRAWINGS

Various embodiments in accordance with the present disclosure will be described with reference to the drawings, in which.

DETAILED DESCRIPTION

Figure 1:
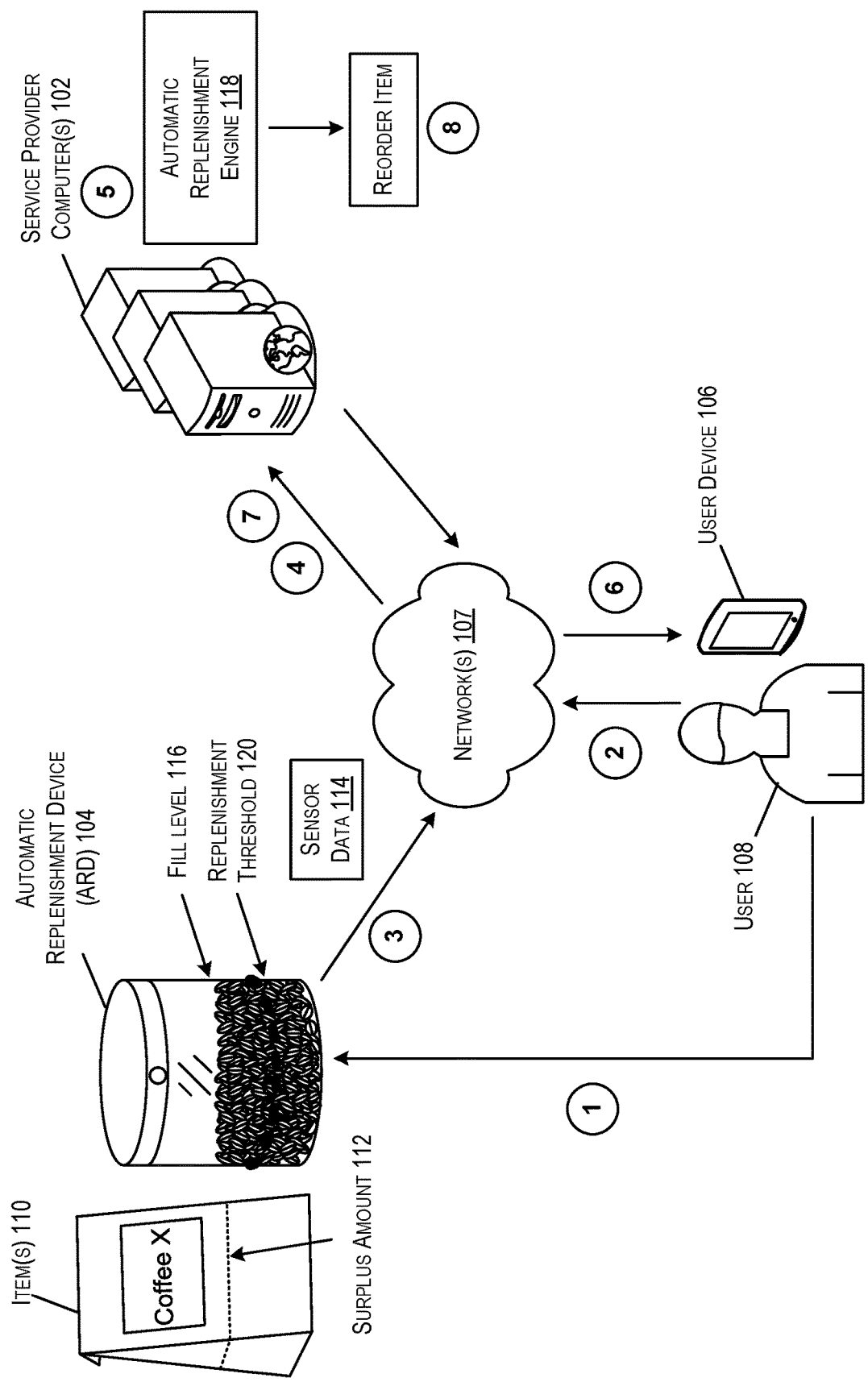
FIG. 1 illustrates a workflow for determining replenishment decisions with respect to potential surplus amounts of an item, the workflow including service provider computers, an ARD, and a user device, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, improving the integration between automatic replenishment devices (ARDs) and a back-end system of an online retailer and improving the management of delivery resources for delivering items associated with the ARDs. Techniques described herein provide systems and methods for determining replenishment decisions with respect to potential surplus amounts of an item. In at least one embodiment, various sensors (e.g., time-of-flight (ToF) sensors, weight sensors, etc.) of an automatic replenishment device (ARD) may be utilized to collect sensor data related to an item situated on or within the ARD (e.g., an item stored at the ARD). The ARD may be any suitable device on/in which an item may be placed. A ToF sensor may determine a distance based on the known speed of light, measuring the time-of-flight of a light signal between the sensor and an object (e.g., the item within the ARD).

In some embodiments, an item (e.g., coffee beans) may be associated with the ARD during an association process conducted with a user device. Initially, the item may include multiple units (e.g., two or more 12 oz. bags of coffee) and/or an initial volume. It may be the case that only some of the item is able to fit in and/or on the ARD at a given time, leaving some surplus of the item to be stored elsewhere. Alternatively, the whole item may be placed in/on the ARD. In some embodiments, the ARD may collect sensor data related to how much of the item is situated in/on the ARD. The sensor data may be provided (e.g., by the ARD) to one or more service provider computers that may utilize the sensor data to determine an amount (e.g., volume, weight, and/or quantity) of the item in and/or on the ARD (e.g., within the container, placed on the ARD, etc.). When the amount drops below a predetermined threshold (e.g., a weight threshold, a particular fill level such as 20% remaining, etc.), the service provider computers may perform a variety of operations.

By way of example, if the item (as initially provided) is able to be entirely stored in and/or on the ARD (e.g., based on a volume, weight, dimensions of the item, packaging dimensions, shipping box dimensions, etc.), the service provider computers may cause an automated order to be generated to reorder the item from an online retailer. The service provider computers may send a notification to the user associated with the item that the order has been generated. In some embodiments, the user may accept or reject the order. The user may be given a time period (e.g., 30 minutes) in which to reject the order, otherwise the default process may cause the order to proceed and the item to be delivered to the user.

In another example, if the item as initially provided is not able to be entirely stored in and/or on the ARD, the service provider computers may cause a timer (e.g., a 12-hour timer, a 30 minute timer, a 24-hour timer, etc.) to be set. The service provider computers may be configured to monitor subsequent sensor data provided by the ARD. If the subsequent sensor data indicates that the weight measurement of the item has increased or the distance between the sensor and the item has decreased, the service provider computers may determine that some amount of the item has been added to the ARD. In this scenario, the service provider computers may determine that the user had surplus of the item which was added to the ARD and the timer may be canceled. If the timer expires and the subsequent sensor data does not indicate that the amount of item in/on the ARD has increased, an automated order may be generated to cause the item to be reordered and eventually delivered to the user. The process may be repeated when sensor data indicates that the amount of the item has once again dropped under the predetermined threshold.

In another example, if the service provider is aware that the item as initially provided is not able to be entirely stored in and/or on the ARD, or even without such information, the service provider computers may be configured to generate an automated order and cause a timer (e.g., a 12-hour timer, a 30 minute timer, a 24-hour timer, etc.) to be set. The service provider computers may be configured to monitor subsequent sensor data provided by the ARD. If the subsequent sensor data indicates that the weight measurement of the item has increased or the distance between the sensor and the item has decreased, the service provider computers may determine that some amount of the item has been added to the ARD. In this scenario, the service provider computers may determine that the user had surplus of the item which was added to the ARD and the timer and automated order may be canceled. If the timer expires and the subsequent sensor data does not indicate that the amount of item in/on the ARD has increased, the automated order may proceed to cause eventual delivery to the user. The process may be repeated when sensor data indicates that the amount of the item has once again dropped under the predetermined threshold.

As yet another example, if the item as initially provided is not able to be entirely stored in and/or on the ARD, the service provider computers may cause a timer (e.g., a 12-hour timer, a 30 minute timer, a 24-hour timer, etc.) to be set. The service provider computers may be configured to monitor subsequent sensor data provided by the ARD. If the subsequent sensor data indicates that the weight measurement has decreased or the distance between the sensor and the item has increased, the service provider computers may determine that some additional amount of the item has been removed from the ARD. In this scenario, the service provider computers may determine that the user does not have surplus of the item. Rather than waiting for expiration, the timer may be canceled and an automated order may be generated to cause the item to be reordered and eventually delivered to the user.

It should be appreciated that the ARD may not be completely empty when an item is added. That is, there may be some of the previously-provided item left in the container. For example, the user may order bag of flour. The bag of flour alone may be capable of being stored within the ARD. However, the ARD may still contain some flour from the user's previous supply. To improve the accuracy of replenishment determinations, the service provider computer may utilize sensor data (e.g., a distance measurement, a weight measurement, etc.) to determine that some amount of the item remained in the ARD prior to the ARD being refilled. The service provider computers may utilize additional sensor data to determine that the bag of flour may not fit in the ARD because of the amount of flour that remained before refill. Thus, the service provider computers may determine that the user has come surplus of the flour that is not contained in/on the ARD. Thus, when the flour falls below the predetermined threshold (e.g., a replenishment threshold), instead of ordering more flour immediately (which might happen if the previous supply was not factored in), the service provider computers may follow any suitable process described herein when it is determined that a surplus of the item exists (or potentially exists) external to the ARD.

In the manner described above, the system may take into account the amount (e.g., volume, quantity, weight, etc.) of the item with respect to the storage capacity of the ARD to more accurately determine when the user is running low on the item. Utilizing the techniques described herein, needless orders may be avoided which in turn may save processing resources at the service provider computers and/or the online retailer. Further, when the accuracy of reorders is improved, the user may not be bombarded with unwanted excess items. Thus, the user may be less likely to return the reordered item, which in turn saves the service provider computers from having to process needless returns.

As another example, the system may be used to process new data that did not exist (is unlikely to exist) with previous ARD solutions because previous ARD solutions did not integrate in the same manner with service provider computers as discussed throughout. Raw sensor data may be received and translated into actual fill amounts and surplus amounts. These amounts are new data that the service provider computers can use to manage the ordering and delivery of replacement items. By using this new data, the management is optimized, unlike existing systems that simply wait of a user order for some periodic automatic reordering.

FIG. 1 illustrates a workflow 100 for determining replenishment decisions with respect to potential surplus amounts of an item, the workflow including service provider computer(s) 102, an automatic replenishment device (ARD) 104, and a user device 106, in accordance with at least one embodiment. The service provider computer(s) 102, the ARD 104, and the user device 106 may be configured to communicate with one another via network(s) 107 (e.g., a local area network, a wide area network, a cellular network, the Internet, or the like) via any suitable communications protocol.

Prior to performance of the workflow 100, the user 108 may utilize any suitable means for obtaining an item(s) 110 (e.g., a large bag of coffee beans). For example, the user 108 may utilize the user device 106 to browse an electronic marketplace of an online retailer for coffee beans. The electronic marketplace may be hosted by the service provider computer(s) 102 and/or another suitable system. Utilizing interfaces provided by the electronic marketplace, the user 108 may purchase the item(s) 110 which may then be delivered to the user 108 utilizing any suitable shipping methods.

At step one, some portion of the item(s) 110 may be placed on/in the ARD 104. Examples of the ARD 104 are provided in FIGS. 2 and 3 in more detail. As depicted in FIG. 1, the ARD 104 may include a container and a lid. The lid may include one or more time-of-flight (ToF) sensors. Once placed on/within the ARD 104 as depicted in FIG. 1, the item(s) 110 may fill the ARD 104 to some level. It may be the case that the item(s) 110 fit entirely within the ARD 104 or some portion of the item(s) 110 are unable to fit in the ARD 104 (or perhaps the user 108 just decided not to put all of the item(s) 110 within the ARD 104). Thus, in some examples, a surplus amount 112 of the item may be stored external to the ARD 104.

At step 2 of the workflow 100, the user 108 may utilize the user device 106 to perform a process for associating the item(s) 110 with the ARD 104. For example, the user device 106 may be utilized to access an application and/or website (e.g., hosted by the service provider computer(s) 102) to perform an association process. During the association process, the user device 106 (e.g., via the application and/or website) may be utilized to provide account information such as a name, a shipping address, billing information, or the like. Alternatively, the user device 106 may be utilized to sign in to a user profile maintained by the service provider computer(s) 102 in order to access previously stored account information. During the association process, the user device 106 may be utilized to associate the item(s) 110 with the ARD 104. As a non-limiting example, an identifier (e.g., a serial number, bar code, or other suitable identifier) of the ARD 104 may be entered, scanned, and/or selected at the user device 106. An item identifier may also be entered, scanned, and/or selected at the user device 106. The user device 106 may then be utilized to provide an indication that the item identifier of the item(s) 110 is to be associated with the identifier of the ARD 104. The association between the item(s) 110 and the ARD 104 may be stored by the service provider computer(s) 102 (e.g., as part of the user profile associated with the user 108 and/or user device 106).

At step 3 of the workflow 100, sensor data 114 may be transmitted by the ARD 104 (e.g., via one or more ToF sensors of the ARD 104, via a weight sensor of the ARD 104, etc.). The sensor data 114 may be collected and/or at any suitable time according to a predetermined schedule, at periodic time intervals, upon sensing user interaction with the item(s) 110 and/or the ARD 104, upon user input entered at the ARD 104, upon instruction from the service provider computer(s) 102 and/or the user device 106, or at any suitable time. The sensor data 114 may indicate a distance measurement that corresponds to the fill level 116.

At step 4, the service provider computer(s) 102 may receive the sensor data 114. The sensor data 114 may include a measured distance between the sensor and the item(s) 110 (and/or a weight measurement or other suitable data). The service provider computer(s) 102 may include an automatic replenishment engine 118.

At step 5, the automatic replenishment engine 118 may determine whether or not the sensor data indicates that the fill level 116 is below the replenishment threshold 120. If the fill level 116 is not below the replenishment threshold 120, the automatic replenishment engine 118 may refrain from generating an automated order for the item(s) 110.

At step 6, the automatic replenishment engine 118 may transmit data related to the sensor data 114 in order to render information about the ARD 104, the item(s) 110, and the fill level 116 at the user device 106. If the fill level 116 is determined to be below the replenishment threshold 120, the automatic replenishment engine 118 may determine whether or not to reorder the item.

In the example depicted in FIG. 1, the automatic replenishment engine 118 may determine that surplus amount 112 exists (or potentially exists) and that the item(s) 110 have fallen below the replenishment threshold 120. Accordingly, the automatic replenishment engine 118 may set a timer (e.g., a 5-hour timer, a 20-minute timer, etc.). Subsequent sensor data may be received from the ARD 104 at step 7. If the subsequent sensor data indicates that the fill level 116 has increased (indicating that the user added some of the surplus amount 112 to the ARD 104), the automatic replenishment engine may cancel the timer and forgo any reordering processing. If the timer expires, the automatic replenishment engine may proceed to reorder the item at step 8. As another example, if the subsequent sensor data received at step 7 indicates that the fill level 116 has decreased, the time may be canceled and the automatic replenishment engine may reorder the item at step 8.

In some embodiments, the automatic replenishment engine 118 may transmit data at any suitable time in order to render information about the ARD 104, the item(s) 110, and the fill level 116 at the user device 106. In some embodiments, the automatic replenishment engine 118 may provide a notification to the user device 106 at step 9 indicating that an automatic order has been placed. In these scenarios, the user 108 may be required to confirm the order before shipment will take place. In other scenarios, the user 108 may be given some time period (e.g., 30 minutes) to reject the order, otherwise the automated order will proceed and the item will be eventually shipped.

Although not depicted in FIG. 1, many additional or alternative workflows are contemplated. For example, any suitable item may be substituted for the item(s) 110. The ARD 104, in some examples resembles the ARD 104 as depicted in FIG. 1, while in other examples, the ARD 104 may resembles a weight measuring device such as the ARD 300 discussed further below with respect to FIG. 3.

Figure 2:
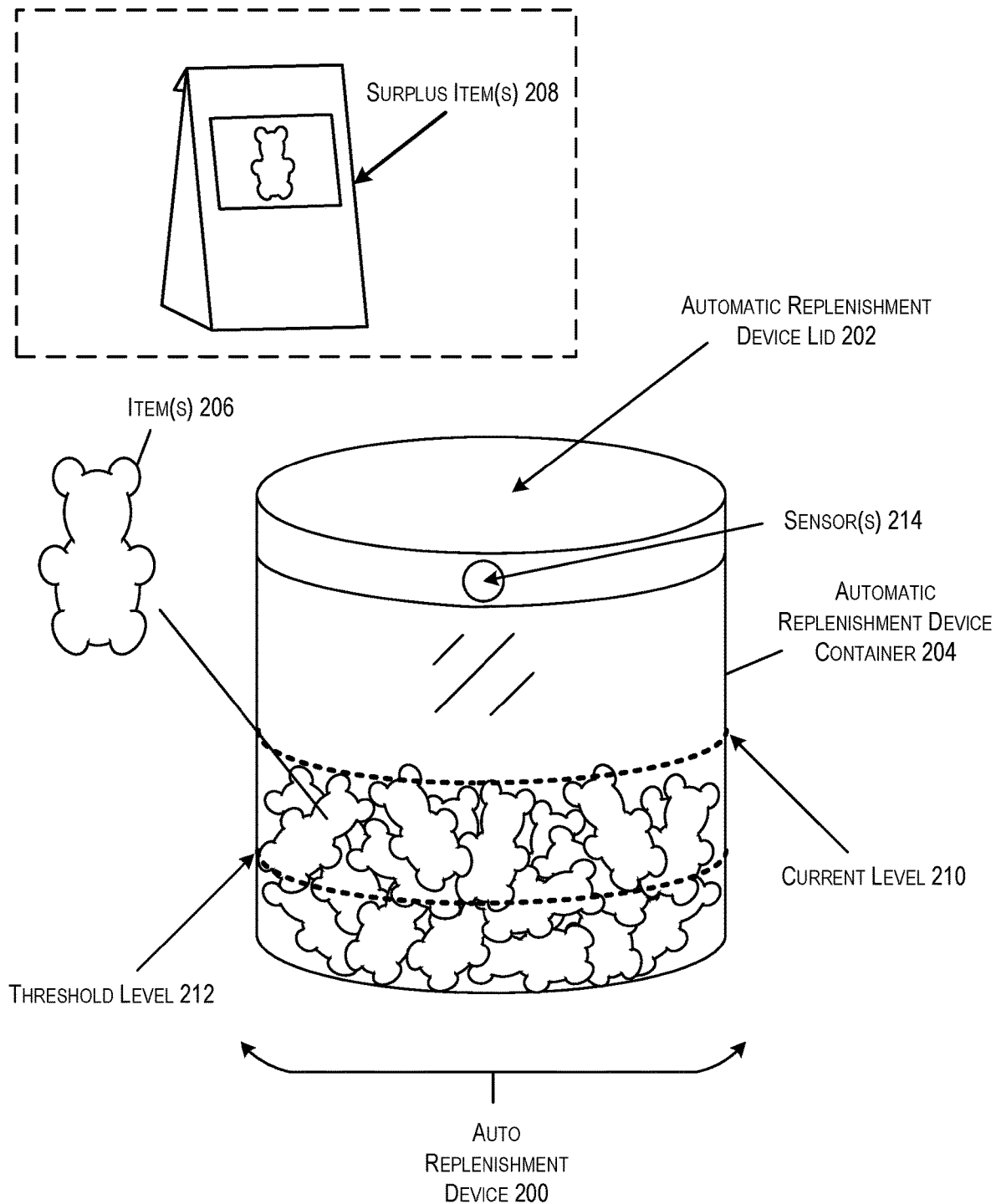
FIG. 2 illustrates an example ARD with some amount of the item placed within the ARD and a surplus amount of the item being external to the ARD, in accordance with at least one embodiment.

FIG. 2 illustrates an example ARD with some amount of the item placed within the ARD and a surplus amount of the item being external to the ARD, in accordance with at least one embodiment. FIG. 2 includes ARD 200 (e.g., an example of the ARD 104 of FIG. 1) that includes an ARD lid 202, and an ARD container 204. One or more item(s) 206 (e.g., gummi bears, coffee grounds, liquid detergent, flour, candy, pretzels, rice, etc.), may be stored within the ARD container 204. In some embodiments, some amount of the item (e.g., surplus item(s) 208) may be stored at a location external to the ARD. FIG. 2 also includes visual representations for a current level of the item(s) 206 at 210 and a threshold level 212. It should be noted that although the ARD 200 of FIG. 2 includes visual representations of a current level of item at 210 and a threshold level 212, these depictions are for clarification of aspects of the embodiments described herein. For example, a current level of item 210 may be determined by service provider computer(s) 102 of FIG. 1 based on sensor data obtained by sensor(s) 214 and maintained in a user profile that is generated and stored by the service provider computer(s) 102. As described herein, the threshold level 212 may be determined by the service provider computer(s) 102 based on the consumption data that is derived from the sensor data obtained by the sensor(s) 214 where the threshold level 212 is stored and associated with a user profile maintained by the service provider computer(s) 102.

It should be noted that the ARD 200 of FIG. 2 represents a container which may be of any shape, depth, or size, in which item(s) 206 are placed within. For example, the ARD 200 may be a 2.5 quart or 4.5 quart cylindrical container. In embodiments, the ARD 200 may include one or more sensor(s) 214 that may be configured to determine a distance of the item(s) 206 that are currently situated within the ARD container 204 of the ARD 200 (i.e., capture or obtain distance measurements between the one or more sensor(s) 214 and the item(s) 206). The sensor(s) 214 may include a time of flight sensor (e.g., a time of flight camera, a time of flight transmitter and receiver combination, etc.), that is configured to determine/detect a distance/amount of item(s) 206 placed in the ARD container 204 of the ARD 200 based at least in part on the time of flight for a signal to be emitted from the one or more sensor(s) 214 to a current level of the item(s) 206 (e.g., 210) or to a surface area of the item(s) 206. In accordance with at least one embodiment, the sensor data collected by the one or more sensor(s) 214 may include distance measurements identifying a distance between the item(s) 206 and one or more sensor(s) 214. The sensor data may include the raw data that was obtained by the sensor(s) 214 and/or the sensor data may include values that represent a conversion from the raw data to any suitable format and/or unit of measurement.

The sensor data may indicate a current distance, amount, and/or volume of the item(s) 206 situated within the ARD container 204. For example, the sensor data may indicate a current distance (e.g., 140 mm, 5.5 inches, etc.) between the one or more sensor(s) 214 and the item(s) 206. The sensor data may indicate a current a current volume of the item(s) (e.g., 57.75 cubic inches, 39.23 cubic inches, etc.) and/or an item number or quantity that indicates a number or quantity of the item(s) 206 situated within the ARD container 204 of ARD 200. In some embodiments, the sensor data indicating a current distance/amount may be utilized (e.g., by the service provider computer(s) 102 of FIG. 1) to calculate a current volume of the item(s) 206 contained in the ARD container 204. The ARD 200 and sensor(s) 214 may be configured to utilize any suitable time of flight signal technology between the sensor(s) 214 and the item(s) 206. Although the ARD 200 of FIG. 2 includes the sensor(s) 214 within or on a surface of the ARD lid 202, the sensor(s) 214 may be placed on one or more interior surfaces of the ARD container 204. In at least one embodiment, the ARD lid 202 may be configured to be placed on any suitable container.

Time of flight signal technology can include any electronic signal technology that can determine the elapsed time period between a transmission of a signal from a source and a return of the signal, or at least a portion thereof, back to the source. Other configurations such as a signal source and signal detector may also be utilized to determine time of flight and distance between the sensor(s) 214 and item(s) 206 (e.g., current level of item(s) 206) utilizing a source/detector or transmitter/receiver. In embodiments, the service provider computers may be configured to determine a distance from the sensor(s) 214 and item(s) 206 (e.g., current level of item(s) 206) using the sensor data obtained by the sensor(s) 214.

For example, the elapsed time period between the transmission of a signal from a source to detection of the signal (e.g., from the sensor(s) 214), or at least a portion thereof, at a detector or receiver, along with the known speed of the signal (e.g., the speed of light) may be utilized to determine the distance between the source of the signal (e.g., sensor(s) 214) and the item(s) 206. The ARD 200 may be configured to transmit the sensor data obtained by sensor(s) 214 to a remote computing device separate from the ARD 200 (e.g., the service provider computer(s) 102 of FIG. 1, a cloud-based server/service, etc.). In some embodiments, the remote computing device may be configured to utilize the sensor data to calculate the distance between the sensor(s) 214 and/or the current level of item(s) 206 and correlate the distance to a volume, amount, and/or quantity of the item(s) 206 left in the ARD container 204. The sensor data may be used to determine the consumption data or consumption rate of item(s) 206 and in embodiments reorder the item(s) 206 upon the amount of the item being equal to or less than the threshold level 212. In some embodiments, the sensor data may be utilized to determine that some portion of the item has been consumed but that an additional portion (e.g., corresponding to the surplus item(s) 208) may exist (or potentially exist) external to the ARD.

By way of example, the item(s) 206 may have come packaged with the surplus item(s) 208. The service provider computers may determine that the combination of item(s) 206 and surplus item(s) 208 may exceed the storage capacity of the ARD 200, or at least, that not all of the items shipped are currently contained with the ARD 200. Alternatively, the service provider computers may determine that the combination of item(s) 206 and surplus item(s) 208 fall within the storage capacity of the ARD 200. If the items as ordered are capable of being stored within the ARD 200, then the service provider computers may be configured to reorder the items when the sensor data indicates that the items have fallen under the threshold level 212. If the items as ordered exceed the storage capacity of the ARD 300 (e.g., a volume of the items as order is greater than the volume capacity of the ARD container 204), the service provider computers may restrict an automatic order from being generated. In some examples, restricting an automatic order from being generated may include first initiating a timer (e.g., a 12-hour timer, a 2-hour timer, a 30 minute timer, etc.). If the user stores additional items (e.g., some of the surplus item(s) 208) within the ARD container 204, and/or the sensor data indicates the fill level has increased, the timer may be canceled and the automatic order may not be generated. If the timer expires, the service provider computers may be configured to reorder the item on behalf of the user. Alternatively, if the items as ordered exceed the storage capacity of the ARD 300 (e.g., a volume of the items as order is greater than the volume capacity of the ARD container 204), the service provider computers may generate an automated order. Upon generating the order, or at another suitable time, a timer may be initiated (e.g., a 12-hour timer, a 2-hour timer, a 30 minute timer, etc.). If the user stores additional items (e.g., some of the surplus item(s) 208) within the ARD container 204 before the timer expires, and/or the sensor data indicates the fill level has increased before the timer expires, the timer and the automated order may be canceled (e.g., deleted). If the timer expires, the service provider computers may be configured to proceed with the automated order item.

In another example, rather than utilizing a timer, the service provider computers may initiate an automated order based at least in part on subsequent sensor data. The subsequent data may indicate that, rather than placing more items on the ARD 300, additional items has been removed from the ARD 300 (e.g., as indicated by sensor data indicating the fill level has decreased). Accordingly, an automated order may be generated independent of user action.

Figure 3:
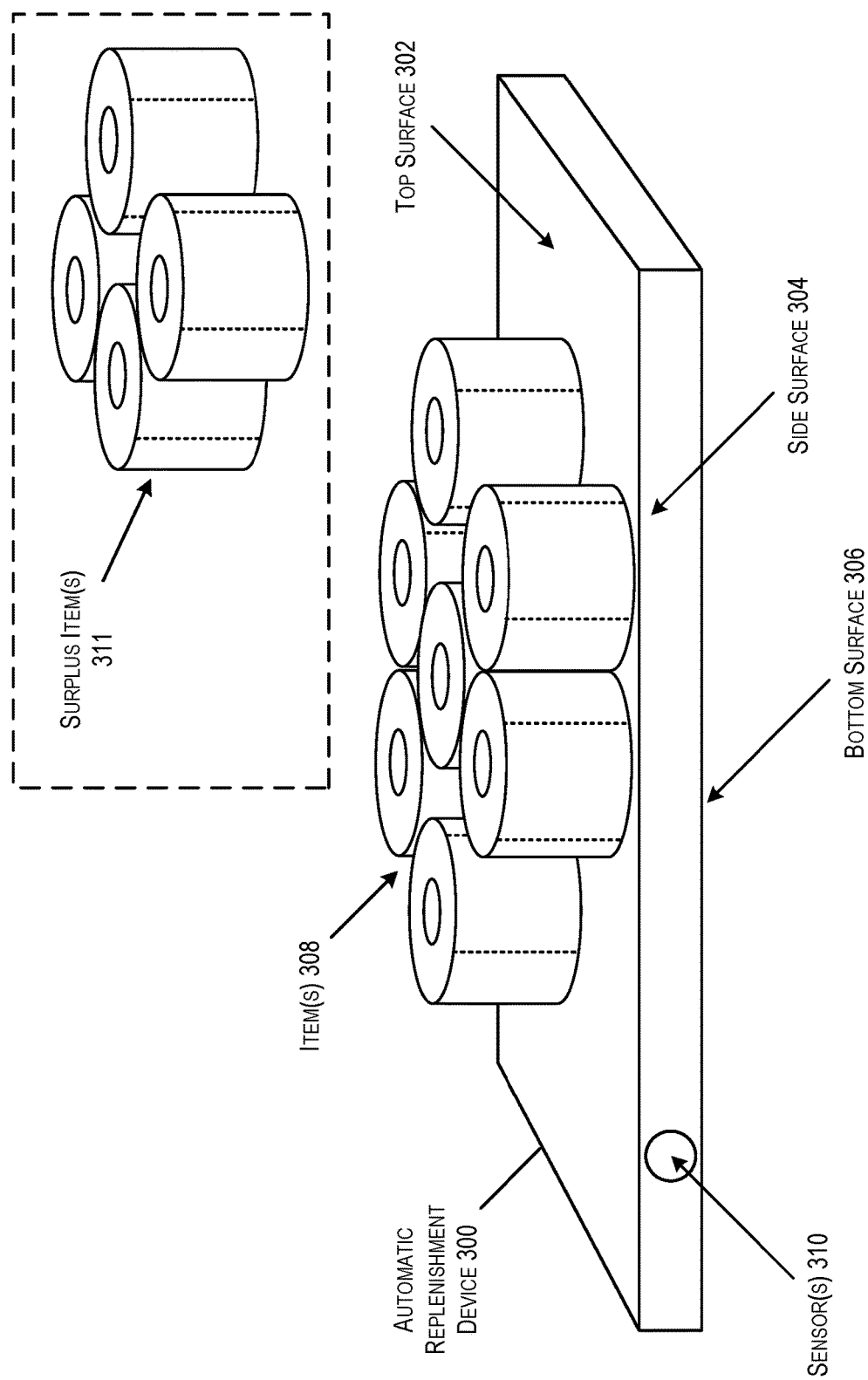
FIG. 3 illustrates another example ARD with items placed on the ARD and a surplus amount of the item being external to the ARD, in accordance with at least one embodiment.

FIG. 3 illustrates an example ARD and items placed on the ARD, in accordance with at least one embodiment. FIG. 3 includes ARD 300 which may have a top surface 302, one or more side surfaces (e.g., side surface 304), and a bottom surface 306. One or more items, such as item(s) 308 may be placed on the top surface 302 of the ARD 300. The ARD 300 may be an example of the ARD 104 from FIG. 1. For the purposes of FIG. 3, although the item(s) 308 may be any type of product or item, the item(s) 308 depicted is bathroom paper. The bottom surface 306 may be in contact with a flat or substantially flat surface, such as a counter, table, or shelf. It should be noted that although the ARD 300 of FIG. 3 represents a mat which may be of any shape, depth, or size, the ARD 300 may be any suitable device on which item(s) 308 may be placed. In embodiments, the ARD 300 may include one or more sensor(s) 310. The sensor(s) 310 may be configured to determine a weight of the item(s) 308 that are currently placed on the top surface 302 of the ARD 300 (i.e., capture or obtain weight measurements of the item(s) 308). The sensor(s) 310 may include a weight sensor (e.g., a load sensor, a strain gauge on a load cell, etc.), that is configured to determine/detect a weight/mass of item(s) 308 placed on the top surface 302 of the ARD 300. In accordance with at least one embodiment, the weight of the item(s) 308 (e.g., sensor data, weight measurements, or property measurements) may include the raw data that was obtained by the sensor(s) 310 and ARD 300 that represents a current weight/mass of the item(s) 308 that are situated on the top surface 302 of ARD 300. The weight measurements may indicate a current weight/mass of the item(s) 308, item volume data that indicates a current volume of the item(s) 308, and/or item number/quantity data that indicates a number or quantity of the item(s) 308 situated on the ARD 300.

The ARD 300 may be configured to transmit, via any suitable network, weight measurements or other sensor data captured by sensor(s) 310 (e.g., weight measurements related to the item(s) 308) to a service provider computer implementing the automatic replenishment engine discussed herein. In accordance with at least one embodiment, the weight measurements may be utilized by the service provider computers to determine consumption data or a rate of consumption by a user associated with ARD 300 of the item(s) 308. The consumption data or rate of consumption may be utilized to determine automatic replenishment decisions (e.g., when to replenish an item) on behalf of a user without the user having to take any action (e.g., revisiting an online retailer and/or electronic marketplace) or provide any indication regarding their consumption.

By way of example, the item(s) 308 may have come packaged with the surplus item(s) 311. The service provider computers may determine that the combination of item(s) 308 and surplus item(s) 311 may exceed the storage capacity of the ARD 300, or at least, that not all of the items shipped are currently residing on the ARD 300. Alternatively, the service provider computers may determine that the combination of item(s) 308 and surplus item(s) 311 fall within the storage capacity of the ARD 300. If the items as ordered are capable of being stored on the ARD 300, or a weight of the items currently stored on the ARD 300 match an previously-identified weight of the items as ordered, then the service provider computers may be configured to reorder the items when the sensor data indicates that the items have fallen under a predetermined threshold (e.g., 20% of the item is left). If the items as ordered exceed the storage capacity of the ARD 300, or a weight of the items currently stored on the ARD 300 is less than the previously-identified weight of the items as ordered, the service provider computers may restrict an automatic order from being generated. In some examples, restricting an automatic order from being generated may include first initiating a timer (e.g., a 12-hour timer, a 2-hour timer, a 30 minute timer, etc.). If the user stores additional items (e.g., some of the surplus item(s) 311) on the ARD 300, and/or the weight of the item(s) 308 increases, the timer may be canceled and the automatic order may not be generated. If the timer expires, the service provider computers may be configured to reorder the item on behalf of the user. Alternatively, if the items as ordered exceed the storage capacity of the ARD 300, the service provider computers may generate an automated order. Upon generating the order, or at another suitable time, a timer may be initiated (e.g., a 12-hour timer, a 2-hour timer, a 30 minute timer, etc.). If the user stores additional items at the ARD before the timer expires, and/or the sensor data indicates the fill level has increased before the timer expires, the timer and the automated order may be canceled (e.g., deleted). If the timer expires, the service provider computers may be configured to proceed with the automated order item.

In another example, rather than utilizing a timer, the service provider computers may initiate an order based at least in part on subsequent sensor data. The subsequent data may indicate that, rather than placing more items on the ARD 300, additional items has been removed from the ARD 300 (e.g., as indicated by a weight measurement that identifies a decrease in weight). Accordingly, an automated order may be generated independent of user action.

Figure 4:
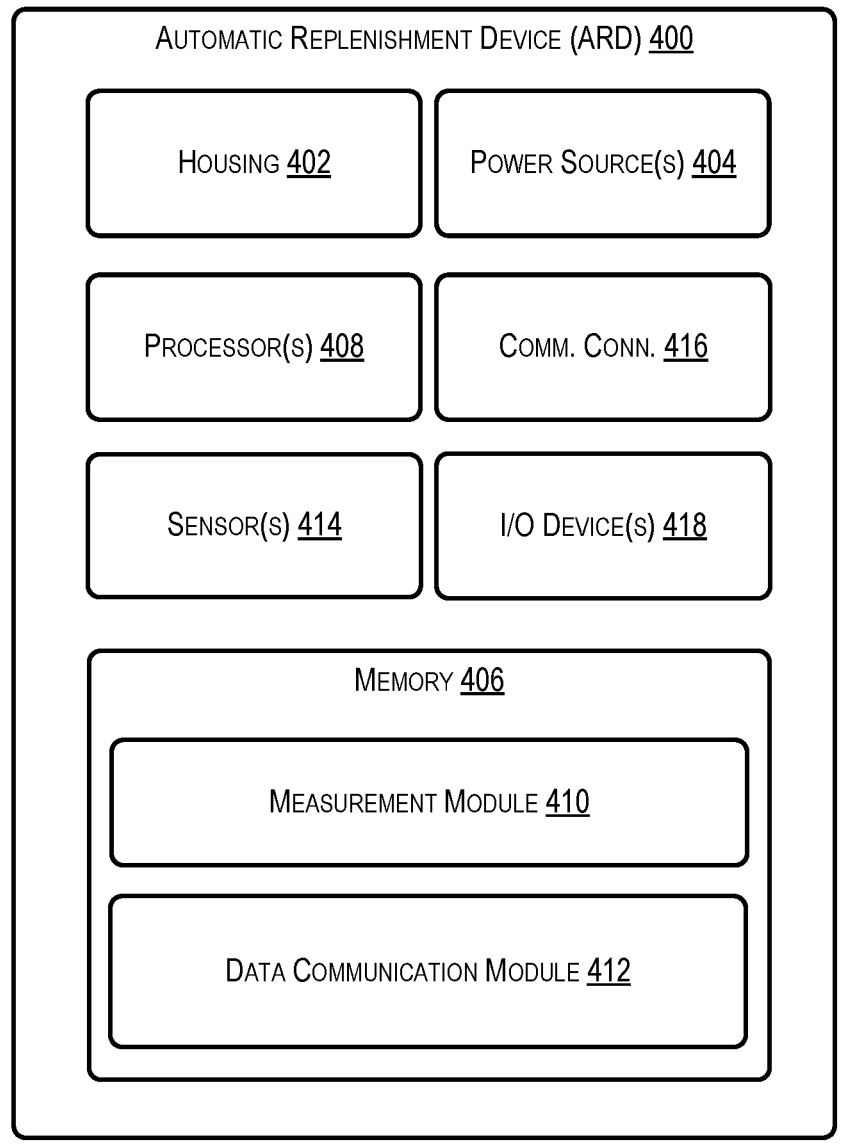
FIG. 4 illustrates a block diagram of components of an ARD, in accordance with at least one embodiment.

FIG. 4 illustrates a block diagram of components of an ARD, in accordance with at least one embodiment. The ARD 400 of FIG. 4 may be an example of the ARD 104, 200, and 300 of FIGS. 1-3, respectively. The ARD 400 (or a portion of the ARD 400 such as the ARD lid 202 of FIG. 2) may include a housing 402 that may include components of ARD 400 discussed further below. In embodiments, the housing 402 may be composed of any type of material (e.g., plastic, metal, etc.), and may serve to prevent the components of the ARD 400 from being damaged or interacting or otherwise contaminating the items placed within ARD 400.

The ARD 400 may include one or more power source(s) 404 that provide power to one or more components of the ARD 400. The power source(s) 404 may include a battery, which may include a one-time use battery or a rechargeable battery. However, the power source(s) 404 may rely on power from another source providing alternating current (AC) power and may be a power inverter. For example, the ARD may be powered via a power cord that is coupled to the ARD 400 and that is detachably connected to a power outlet, such as a wall outlet. In some embodiments, the ARD 400 may include a power level detector that is configured to determine and display a power level for the ARD 400 using alpha-numeric characters that indicate a current power level of a battery of the ARD 400 and power source(s) 404. The power level may be transmitted by the ARD 400 to a remote computing device (e.g., the service provider computer(s) 102 of FIG. 1), which may track the power level of the power source(s) 404 over time. In some embodiments, the ARD 400 and/or the remote computing device may provide a notification (e.g., to a client device not pictured) of the power level via any suitable means such an e-mail message, a text message, a mobile application, a website, etc.

The ARD 400 may include at least one memory (e.g., memory 406) and one or more processing units (e.g., processor(s) 408). The processor(s) 408 may be implemented as appropriate in hardware, computer-executable instructions, software, firmware, or combinations thereof. Computer-executable instruction, software or firmware implementations of the processor(s) 408 may include computer-executable or machine-executable instructions written in any suitable programming language to perform the various functions described.

The memory 406 may include more than one memory and may be distributed throughout the ARD 400. The memory 406 may store program instructions (e.g., related to the measurement module 410 and/or the data communication module 412) that are loadable and executable on the processor(s) 408, as well as data generated during the execution of these programs. Depending on the configuration and type of memory, the memory 406 may be volatile (such as random access memory (RAM)) and/or non-volatile (such as read-only memory (ROM), flash memory, or other memory). In some implementations, the memory 406 may include multiple different types of memory, such as static random access memory (SRAM), dynamic random access memory (DRAM), or ROM.

Turning to the contents of the memory 406 in more detail, the memory 406 may include one or more application programs, modules or services for implementing the features disclosed herein including measurement module 410 and/or the data communication module 412. The measurement module 410 may include instructions that, when executed by the processor(s) 408 may cause the sensor(s) 414 to capture sensor data including distance measurements and/or weight data associated with the items placed on, or within, the ARD 400. A distance measurement may quantify a distance between the sensor(s) 414 and the item on/within the ARD 400. Weight data may indicate an amount of weight currently placed on/within the ARD 400. The memory 406 may be configured to store the collected sensor data. In some embodiments, the measurement module 410 may be configured to convert raw sensor data into any suitable format and/or unit. The measurement module 410 may be configured to provide sensor data and/or converted sensor data to the data communications module 412.

In some embodiments, the data communication module 412 may include instructions that, when executed by the processor(s) 408, transmit and receive data via communication connection(s) 416. The communication connection(s) 416 may include suitable communication interfaces for communicating via Bluetooth (Bluetooth Low Energy (BLE)), WiFi, a cellular connection (e.g., 3G, 4G, LTE, etc.). The communication connection(s) 416 may be configured to transmit the data to a remote computing device (e.g., the service provider computer(s) 102 of FIG. 1) or relay data to the remote computing device using a proxy device (e.g., a smartphone, a laptop, a desktop computer, or any suitable device capable of performing data transfers with the remote computing device). The communication connection(s) 416 any may utilize known or widely used communication protocols such as a wireless connection (WiFi network), a wired connection to a network, cellular network, short-range or near-field networks (e.g., Bluetooth), infrared signals, local area networks, wide area networks, the Internet, etc.

In at least one embodiment, the data communication module 412 may be configured to obtain sensor data from the measurement module 410 and/or the memory 406. The data communication module 412 may be responsible for transmitting such sensor data to a remote computing device (e.g., the service provider computer(s) 102) according to any suitable communications protocol. The sensor data may be communicated in any manner, such as via Bluetooth (Bluetooth Low Energy (BLE) may also be considered when using the term "Bluetooth"), WiFi, a cellular connection (e.g., 3G, 4G, LTE, etc.), and so on.

In at least one embodiment, the data communication module 412 may be configured to receive data via the communication connection(s) 416. For example, the data communication module 412 may be configured to receive item information (e.g., an item identifier, unit weight, material consistency, item volume, item quantity, or any suitable attribute of an item) indicating an item that is placed on, or within, the ARD 400. In some embodiments, the item information or other suitable information communicated to the data communication module 412 may include/indicate conversion algorithms for converting raw sensor data into a particular format and/or unit. In still further embodiments, the data communication module 412 may be configured to receive any suitable information for instructing the measurement module 410 in a manner of collecting sensor data utilizing sensor(s) 414. By way of example, an instruction may be received by the data communication module 412 and communicated to the measurement module 410 that indicates that sensor data is to be collected according to a provided schedule, at a particular periodic rate, or the like. Generally, any suitable data that is to be transmitted or received by the ARD 400 may be processed by the data communication module 412 and provided to any other module and/or component of the ARD 400.

The ARD 400 may include sensor(s) 414 such as a time of flight sensor, or other suitable sensors such as time of flight camera sensors, scale sensors, or infrared sensors that are configured to obtain or capture sensor data of items placed on and/or within the ARD 400. The time of flight sensors may include signal transmitters and receivers that are configured to determine an amount, quantity, weight measurement, and/or volume of an item stored on and/or within the ARD 400 or calculate a distance from the source of the signal to the receptor of the signal which can be converted into an amount (e.g., a volume) of the item stored on and/or within the ARD 400.

The sensor(s) 414 may be configured to periodically obtain sensor data regarding the items placed on or within the ARD 400 at predetermined intervals, such as every day, every 12 hours, every 6 hours, every hour, every 15 minutes, and so on. In some embodiments, the sensor(s) 414 may determine/sense when an item is placed on or within the ARD 400, which may cause the sensor(s) 414 to obtain sensor data associated with the item(s). The sensor(s) 414 may also be instructed (e.g., by the measurement module 410) to obtain sensor data via instructions initiated at a remote computing device (e.g., the service provider computer(s) 102). The frequency of sensor data collection performed by the sensor(s) 414 may be adjusted over time, which may be based on the rate of consumption of the items and/or the manner in which the ARD 400 is being powered. For instance, if the ARD 400 is being powered via a power cord and power outlet, the sensor data may be obtained more frequently (e.g., every hour, every 15 minutes, etc.). However, if the ARD 400 is being powered using a battery, the sensor data may be collected less frequently to conserve battery life (e.g., once per day).

The ARD 400 may also include input/output (I/O) device(s) 418 and/or ports, such as for enabling connection with a keyboard, a mouse, a pen, a voice input device, a touch input device, a display, speakers, a printer, or other I/O device. The I/O device(s) 418 may be in any suitable form (e.g., a button, a touchpad, etc.) to enable data to be provided to any suitable component of the ARD 300 and/or for presenting information (e.g., text, lights, sounds) at the ARD 400 (e.g., via speaker, a display, haptic feedback, etc.).

Figure 5:
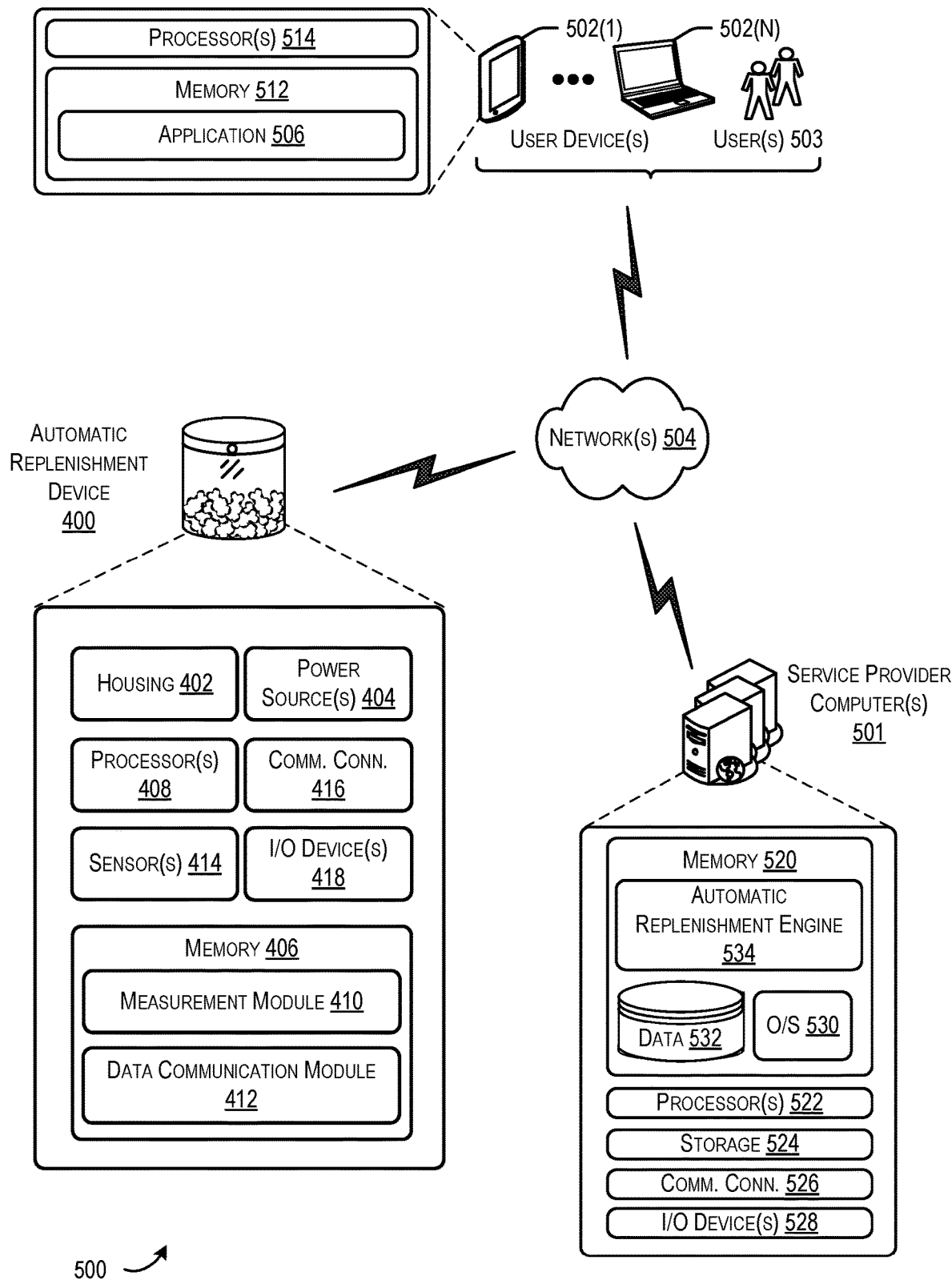
FIG. 5 illustrates an example architecture for determining replenishment decisions with respect to potential surplus amounts of an item as described herein that includes one or more service provider computers, one or more user devices, and/or an ARD connected via one or more networks, in accordance with at least one embodiment.

FIG. 5 illustrates an example architecture 500 for determining replenishment decisions with respect to potential surplus amounts of an item as described herein that includes one or more service provider computers 501 (e.g., the service provider computer(s) 102 of FIG. 1), one or more user devices 502, and/or an ARD (e.g., ARD 400) connected via one or more networks 504 (e.g., the network(s) 107 of FIG. 1), in accordance with at least one embodiment. In architecture 500, one or more users 503 (e.g., customers, users, consumers, etc.) may utilize user computing devices 502(1)-(N) (collectively, user devices 502) to access application 506 (e.g., a browser application, a shopping application, etc.) or a user interface (UI) accessible through the application 508. In embodiments, the user devices 502 may include one or more components for enabling the user(s) 503 to interact with the application 508.

The user devices 502 may include at least one memory 512 and one or more processing units or processor(s) 514. The memory 512 may store program instructions that are loadable and executable on the processor(s) 514, as well as data generated during the execution of these programs. Depending on the configuration and type of the user devices 502, the memory 512 may be volatile (such as random access memory (RAM)) and/or non-volatile (such as read-only memory (ROM), flash memory, etc.). The user devices 502 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 502. In some implementations, the memory 512 may include multiple different types of memory, such as static random access memory (SRAM), dynamic random access memory (DRAM), or ROM.

Turning to the contents of the memory 512 in more detail, the memory 512 may include an operating system and one or more application programs or services for implementing the features disclosed herein. Additionally, the memory 512 may include one or more modules for implementing the features described herein including the automatic replenishment engine 558.

The architecture 500 may also include one or more service provider computers 501 (e.g., an example of the service provider computer(s) 102 of FIG. 1) that may, in some examples, provide computing resources such as, but not limited to, client entities, low latency data storage, durable data store, data access, management, virtualization, hosted computing environment or "cloud-based" solutions, electronic content performance management, media streaming services, content generation, etc. The service provider computers 501 may implement or be an example of the service provider computer(s) described herein. The one or more service provider computers 501 may also be operable to provide site hosting, media streaming services, computer application development, and/or implementation platforms, combinations of the foregoing, or the like to the one or more users 403 via user devices 502.

In some examples, the networks 504 may include any one or a combination of many different types of networks, such as cable networks, the Internet, wireless networks, cellular networks, and other private and/or public networks. While the illustrated examples represents the users 403 communicating with the service provider computers 501 over the networks 504, the described techniques may equally apply in instances where the users 503 interact with the one or more service provider computers 501 via the one or more user devices 502 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 501 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 501 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 501 may be in communication with the user devices 502 and/or the ARD 400 via the networks 504, or via other network connections. The one or more service provider computers 501 may include one or more servers, perhaps arranged in a cluster or as individual servers not associated with one another.

In one illustrative configuration, the one or more service provider computers 501 may include at least one memory 520 and one or more processing units or processor(s) 522. The processor(s) 522 may be implemented as appropriate in hardware, computer-executable instructions, firmware, or combination thereof. Computer-executable instruction or firmware implementations of the processor(s) 522 may include computer-executable or machine-executable instructions written in any suitable programming language to perform the various functions described when executed by a hardware computing device, such as a processor. The memory 520 may store program instructions that are loadable and executable on the processor(s) 522, as well as data generated during the execution of these programs. Depending on the configuration and type of the one or more service provider computers 501, the memory 520 may be volatile (such as RAM) and/or non-volatile (such as ROM, flash memory, etc.). The one or more service provider computers 501 or servers may also include additional storage 524, which may include removable storage and/or non-removable storage. The additional storage 524 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 520 may include multiple different types of memory, such as SRAM, DRAM, or ROM.

The memory 520, the additional storage 524, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 520 and the additional storage 524 are all examples of non-transitory computer storage media. Additional types of non-transitory computer storage media that may be present in the one or more service provider computers 501 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 501. Combinations of any of the above should also be included within the scope of non-transitory computer-readable media.

The one or more service provider computers 501 may also contain communication connection interface(s) 526 that allow the one or more service provider computers 501 to communicate with a data store, another computing device or server, user terminals, and/or other devices on the networks 504. The one or more service provider computers 501 may also include I/O device(s) 528, such as a keyboard, a mouse, a pen, a voice input device, a touch input device, a display, speakers, a printer, etc.

Turning to the contents of the memory 520 in more detail, the memory 520 may include an operating system 530, one or more data stores 532, and/or one or more application programs or services for implementing the features disclosed herein including the automatic replenishment engine 534 (e.g., an example of the automatic replenishment engine 118 of FIG. 1). In accordance with at least one embodiment, the automatic replenishment engine 534 may be configured to maintain a user profile associated with a user, determine a current fill level associated with an item situated on or within an ARD, determine a current weight of the item situated on or within an ARD, or the like. The automatic replenishment engine 534 will be discussed in further detail below with respect to FIG. 6.

The architecture 500 also includes the ARD 400 of FIG. 4. As disclosed herein, the ARD 400 may be configured, among other things, to utilize sensor(s) 414 to obtain sensor data associated with items situated on or within the ARD 400.

Figure 6:
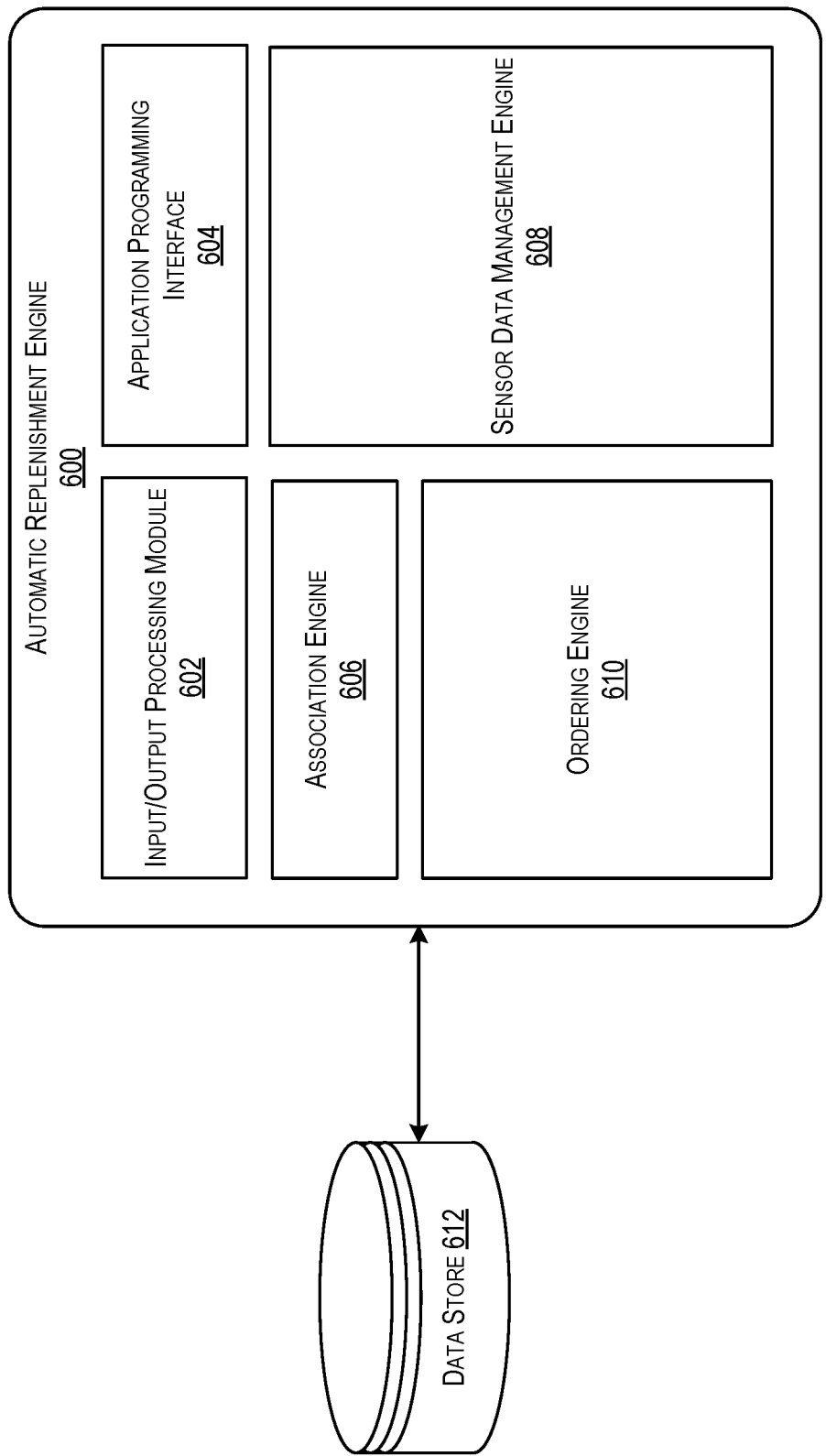
FIG. 6 illustrates a block diagram of components of an automatic replenishment engine, in accordance with at least one embodiment.

FIG. 6 illustrates a block diagram of components of an automatic replenishment engine 600, in accordance with at least one embodiment. Automatic replenishment engine 600 may be an example of the automatic replenishment engine 534 of FIG. 5. As shown, the example embodiment includes a number of modules including, but not limited to, an input/output processing module 602, an application programming interface 604, an association engine 606, a sensor data management engine 608, and an ordering engine 610. It should be appreciated that each module of FIG. 6 may be executed on a single computer, and or each component, or sets of components may be executed on separate computers. The modules/engines of FIG. 6 may be communicatively coupled to the data store 612 (e.g., the data store 532 of FIG. 5) such that data may be exchanged between the modules/engines and the data store 612.

In at least one embodiment, the automatic replenishment engine 600 includes the application programming interface 604. Generally, the application programming interface 604 may be utilized to receive and/or provide any suitable information to and/or from the automatic replenishment engine 600 (or modules of the automatic replenishment engine 600) with respect to any of the examples provided herein.

In the embodiment shown in the drawings, the association engine 606, a component of the automatic replenishment engine 600, may be configured to provide interface(s) for collecting user account information and/or association information related to an item (e.g., the item(s) 110 of FIG. 1) and an ARD (e.g., the ARD 104, 200, 300, and/or 400 of FIGS. 1-4). The association engine 606 may be configured to store (e.g., within a user profile associated with a user) received user account information and/or association information collected from the provided interfaces. In some embodiments, the user profile may be stored within the data store 612 or at another suitable storage location accessible to the association engine 606.

In some embodiments, the input/output processing module 602 may be configured to provide a calculated fill level and/or current amount of an item that is in/on an ARD. The calculated fill level/current amount may be presented via one or more interfaces provided by the input/output processing module 602 and/or the service provider computer(s) 102 and 401, and/or via a notification (e.g., email, text message, push notification etc.) provided by the input/output processing module 602.

In some embodiments, the sensor data management engine 608 may be configured to receive sensor data. The received sensor data may have been generated by one or more sensors of the ARDs 104, 200, 300, and/or 400 of FIGS. 1-4. The received sensor data may include at least a distance measurement (e.g., quantifying a distance between the sensor and an item within the ARD) and/or a weight measurement (e.g., quantifying a weight of an item(s) placed on the ARD). The sensor data management engine 608 may be configured to calculate a fill level and/or or current amount of the item from the sensor data (e.g., a distance measurement, a weight measurement, an image, etc.). The calculated fill level/current amount may be provided to the input/output processing module 602 for rendering the information on a display of a user device. The calculated fill level/current amount may be provided to the ordering engine 610 for further processing. In at least one embodiment, the calculated fill level/current amount may be include some amount of a previously stored item. For example, some coffee beans may be left in the ARD when the ARD is refilled. Thus, the calculated fill level/current amount may include previously added items as well as newly added items.

In at least one embodiment, the ordering engine 610 may receive the calculated fill level/current amount. The ordering engine 610 may be configured to determine whether the item associated with the ARD (e.g., the item(s) 110 of FIG. 1) is able to be place entirely within/on the ARD or if only some of the item is able to be placed within/on the ARD. By way of example, the ordering engine 610 may be configured to look up item attributes associated with the item (e.g., from an online retailer inventory stored at the data store 612 or at another suitable storage location accessible to the ordering engine 610). The item attributes may include weight, package dimensions, a number of units, a size, a shape, a volume, a quantity, shipping package dimensions, or the like. Based on the item attributes, the ordering engine 610 may calculate a minimum fill level/amount for the item. The ordering engine 610 may be further configured to determined, based on the minimum fill level/amount of the item and the storage capacity (e.g., volume and/or weight) of the ARD, whether or not the item may be stored entirely within/on the ARD.

In at least one embodiment, the ordering engine 610 may be configured to utilize a current fill level/current amount of a previously-provided item when determining whether or not the item (as obtained from the online retailer) may be placed in or on the ARD. That is, the ordering engine 610 can add the minimum fill level/amount required to store the item to the current fill level/current amount of the ARD in order to determine that the item will fit in/on the ARD, or that there will be a surplus amount of the item that will need to be stored elsewhere.

In some embodiments, the ordering engine 610 may store the determination as to whether or not the item will fit entirely in the ARD or not (factoring in a previous amount of the item stored in/on the ARD or not). For example, the ordering engine 610 may store an indicator that indicates that surplus is available or not. The indicator may be stored as part of the user profile managed by the service provider computers 501, in the data store 612, or at any suitable location. As another example, the ordering engine 610 may store an estimated amount of surplus associated with the item. By way of example, the ordering engine 610 could store a quantity (e.g., 5 rolls of bathroom tissue, 4 bags of coffee, etc.) that are estimated to be in surplus.

In some embodiments, as the item is consumed and/or refilled, the sensor data management engine 608 may be configured to maintain a running total of the amount of surplus. For example, the sensor data management engine 608 could determine a change in fill level/current amount (weight, quantity, etc.) of the item stored on/in the ARD. The sensor data management engine 608 may add/subtract an amount corresponding to the change from the estimated surplus amount. In some embodiments, the sensor data management engine 608 and/or the ordering engine 610 may provide the estimated amount of surplus and/or the indicator indicating that a surplus exists (or potentially exists) to a user device (e.g., the user device 106 of FIG. 1) for display.

The ordering engine 610 may be configured to determine whether or not the calculated fill level/current amount is below a predetermined threshold (e.g., a replenishment threshold). If the current fill level/current amount is below the predetermined threshold, and a surplus has not been identified (e.g., the indicator indicates that there is no surplus, or the estimated surplus is 0), the ordering engine 610 may perform one or more operations to generate an automated order to reorder the item on behalf of the user. In some embodiments, the ordering engine 610 may stimulate the input/output processing module 602 to provide a notification to the user (e.g., via user device 106) that an order has been placed for the item. The user may elect to accept or reject the order. If the user accepts the order, or does not respond within a given time period (e.g., 30 minutes), the automated order may proceed, resulting in the item eventually being delivered to the user. If the user rejects the order, the automated order may be deleted and no further processing may take place.

If the current fill level/current amount is below the predetermined threshold, and a surplus has not been identified (e.g., the indicator indicates that there is no surplus, or the estimated surplus is 0), the ordering engine 610 may perform one or more operations to generate an automated order to reorder the item on behalf of the user. In some embodiments, the ordering engine 610 may stimulate the input/output processing module 602 to provide a notification to the user (e.g., via user device 106) that an order has been placed for the item. The user may elect to accept or reject the order. If the user accepts the order, or does not respond within a given time period (e.g., 30 minutes), the automated order may proceed, resulting in the item eventually being delivered to the user. If the user rejects the order, the automated order may be deleted and no further processing may take place.

If the current fill level/current amount is below the predetermined threshold, and a surplus has been identified (e.g., the indicator indicates that there is a surplus, or the estimated surplus is greater than 0), the ordering engine 610 may perform one or more operations to set a timer (e.g., a 5-hour timer, a 12-hour timer, etc.). If the timer expires, the ordering engine 610 may be stimulated to proceed with automated order which may cause the item to be reordered and eventually delivered to the customer. Prior to timer expiration, the sensor data management engine 608 may receive subsequent sensor data that indicates that the ARD has been filled with more of the item, or more of the item has been removed from the ARD. If the ARD has been filled some additional amount, the ordering engine 610 may be configured to delete the timer which will cause the ordering engine 610 to forgo the generation of the automated order. If more of the item has been removed from the ARD, the ordering engine 610 may cancel the timer and proceed with the automated order. Alternatively, if a surplus has been identified, the ordering engine 610 may generate an automated order. Upon generating the order, or at another suitable time, a timer may be initiated (e.g., a 12-hour timer, a 2-hour timer, a 30 minute timer, etc.). If the user stores additional items at the ARD before the timer expires, and/or the sensor data indicates the fill level has increased before the timer expires, the timer and the automated order may be canceled (e.g., deleted). If the timer expires, the ordering engine 610 may be configured to proceed with the automated order item.

The input/output processing module 602 may be configured to provide notifications or presentations of the current fill level/current amount and/or a surplus amount at any suitable time. The current fill level/current amount may be provided within an email, a text message, a push notification, an online retailer website, via an application, or the like.

Figure 7:
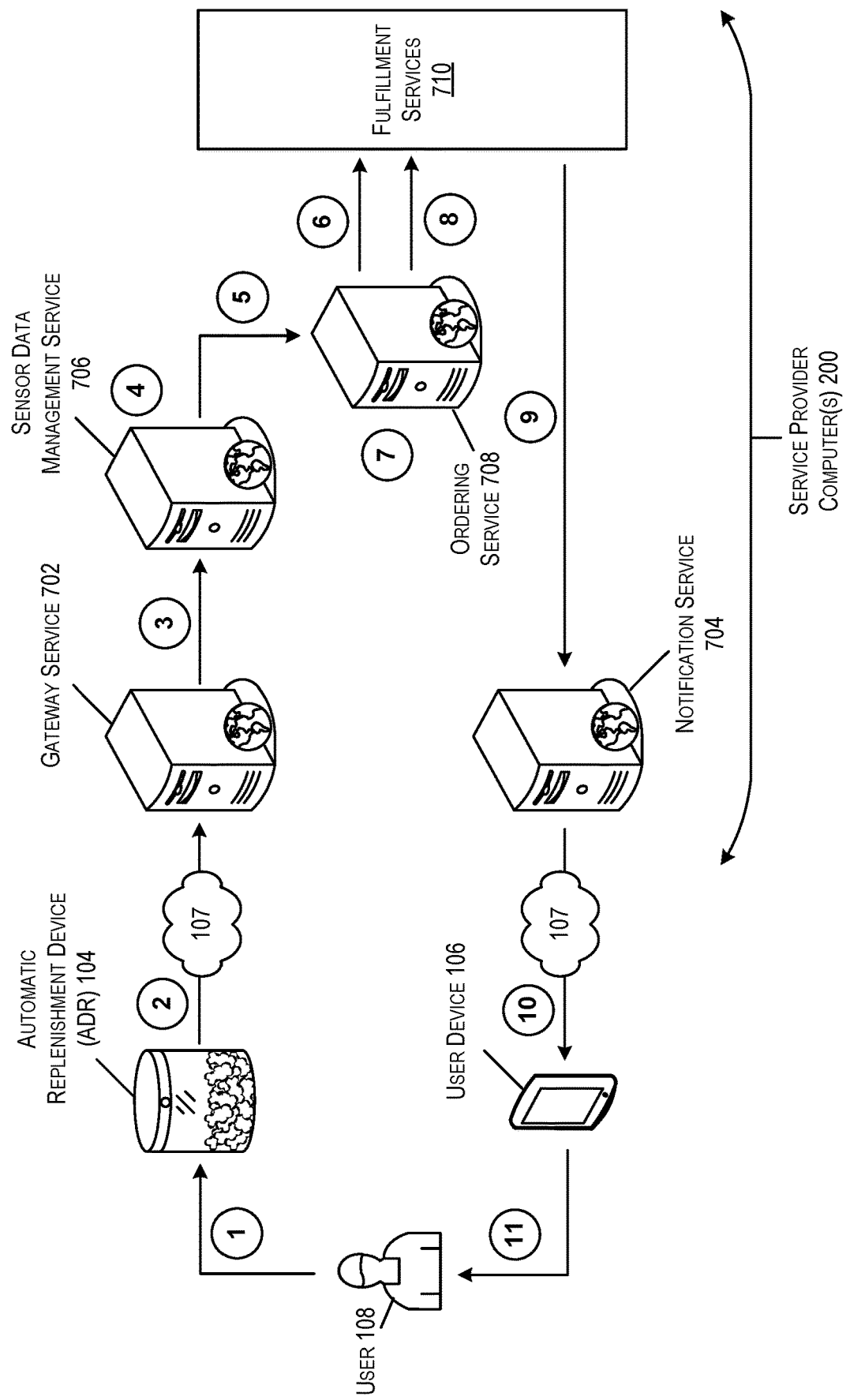
FIG. 7 illustrates a first example protocol for replenishing an item, in accordance with at least one embodiment.

FIG. 7 illustrates a first example protocol 700 for replenishing an item, in accordance with at least one embodiment. The protocol 700 may be performed by the ARD 104 and user device 106 of FIG. 1 and service provider computers 501 of FIG. 5. It should be appreciated that the gateway service 702, the notification service 704, the sensor data management service 706, the ordering service 708, the fulfillment services 710 may be provided by the service provider computers 501 of FIG. 5. In some embodiments, the gateway service 702 and the notification service 704 may be provided as part of the input/output processing module 602 of FIG. 6, the sensor data management service 706 may be provided as part of the sensor data management engine 608 of FIG. 6, and the ordering service 708 may be provided as part of the ordering engine 610 of FIG. 6.

At step 1, the user 108 of FIG. 1 may fill the ARD with an item (e.g., gummi bears). The item may fill the ARD entirely, or the item may only partially fill the ARD. In the example depicted in FIG. 7, no surplus of the item exists (or is unlikely to exist).

At step 2, the ARD 104 may provide sensor data via the network(s) 107 to the gateway service 702. The gateway service 702 may be configured to execute security protocols and routing protocols to ensure that the sensor data is being received from a trusted source and that the sensor data is routed to the appropriate service (e.g., the sensor data management service 706).

At step 3, the sensor data may be forward by the gateway service 702 to the sensor data management service 706. The sensor data management service 706 may be configured to provide the functionality described above in connection with the sensor data management engine 608 of FIG. 6.

At step 4, the sensor data management service 706 may be configured to calculate a current fill level. If the sensor data includes a distance measurement (e.g., the ARD 104 is an example of the ARD 200 of FIG. 2), the sensor data management service 706 may be configured to calculate a volume, weight, and/or amount/quantity of the item within/on the ARD 104 using the distance measurement (e.g., quantifying a distance between a sensor of the ARD 104 and the item within/on the ARD). If the sensor data includes a weight measurement (e.g., the ARD 104 is an example of the ARD 300 of FIG. 3), the sensor data management service 706 may be configured to calculate a volume, weight, and/or amount/quantity of the item within/on the ARD 104 using the weight measurement (e.g., an amount quantifying how much the item placed in/on the ARD 104 weighs).

At step 5, the sensor data management service 706 may publish the computed fill level to the ordering service 708. The ordering service 708 may determine whether or not there is a potential surplus of the item external to the ARD 104. For example, the ordering service 708 may be configured to retrieve/obtain item attributes associated with the item (e.g., from the fulfillment services 710) at step 6. The item attributes may include weight, package dimensions, a number of units, a size, a shape, a volume, a quantity, shipping package dimensions, or the like. Based on the item attributes, the ordering service 708 may calculate a minimum fill level/amount for the item. The ordering service 708 may be further configured to determine, based on the minimum fill level/amount of the item and the storage capacity (e.g., volume and/or weight) of the ARD 104, whether or not the item is entirely stored within/on the ARD 104. For example, if the minimum fill level/current amount of the item is equal to or less than the storage capacity associated with the ARD 104, then the ordering service 708 may identify that the item is fully stored within the ARD 104. In some examples, the ordering service 708 may store an indicator indicating that there is no surplus of the item. If the minimum fill level/current amount of the item is greater than the storage capacity associated with the ARD 104, then the ordering service 708 may identify that the item is fully stored within the ARD 104. In some examples, the ordering service 708 may store an indicator indicating that there is a surplus of the item.

In at least one embodiment, the ordering service 708 may be configured to utilize a current fill level/current amount of a previously-provided item when determining whether or not the item is entirely stored within or on the ARD 104. That is, the ordering service 708 can add the minimum fill level/amount required to store the item to the current fill level/current amount of the ARD 104 in order to determine that the item entirely fits in/on the ARD 104, or that there may be a surplus amount of the item external to the ARD 104. If the minimum fill level/current amount of the item plus the current fill level/current amount is less than or equal to the storage capacity associated with the ARD 104, then the ordering service 708 may identify that the item is fully stored within the ARD 104. In some examples, the ordering service 708 may store an indicator indicating that there is no surplus of the item. If the minimum fill level/current amount of the item is greater than the storage capacity associated with the ARD 104, then the ordering service 708 may identify that the item is fully stored within the ARD 104. In some examples, the ordering service 708 may store an indicator indicating that there is a surplus of the item.

At step 7, the ordering service 708 may compare the current fill level/current amount within/on the ARD 104 to a replenishment threshold. The ordering service 708 may also check whether an order for the item has already been placed. If the current fill level/current amount within/on the ARD 104 is less than or equal to the replenishment threshold, and no other order for the item exists, the ordering service may determine (e.g., via the indicator determined above) that the item is fully stored within the ARD 104, the ordering service 708 may generate an automated order at step 8. Generating an automated order may include transmitting item information to the fulfillment services 710 in order to stimulate the reordering of the item by the fulfillment services 710.

At step 9, the fulfillment services 710 (or the ordering service 708) may request that a notification of the order be sent to the user. The request may be transmitted to the notification service 704.

At step 10, the notification service 704 may transmit a notification (e.g., via an email, text message, website, application, push notification, or the like) via network(s) 107, to the user device 106. The user device 106 may present the notification to the user 108 at step 11. In some embodiments, the user 108 may be enabled to accept or reject the order. If rejection does not occur within a time period (e.g., 30 minutes) of initiation of the order, or the user affirmatively accepts the order, the order may proceed and the item may be reordered and eventually delivered to the customer. If rejection occurs within the time period, the rejection may be received by the ordering service 708 and/or the fulfillment services 710 and the automated order may be canceled.

Figure 8:
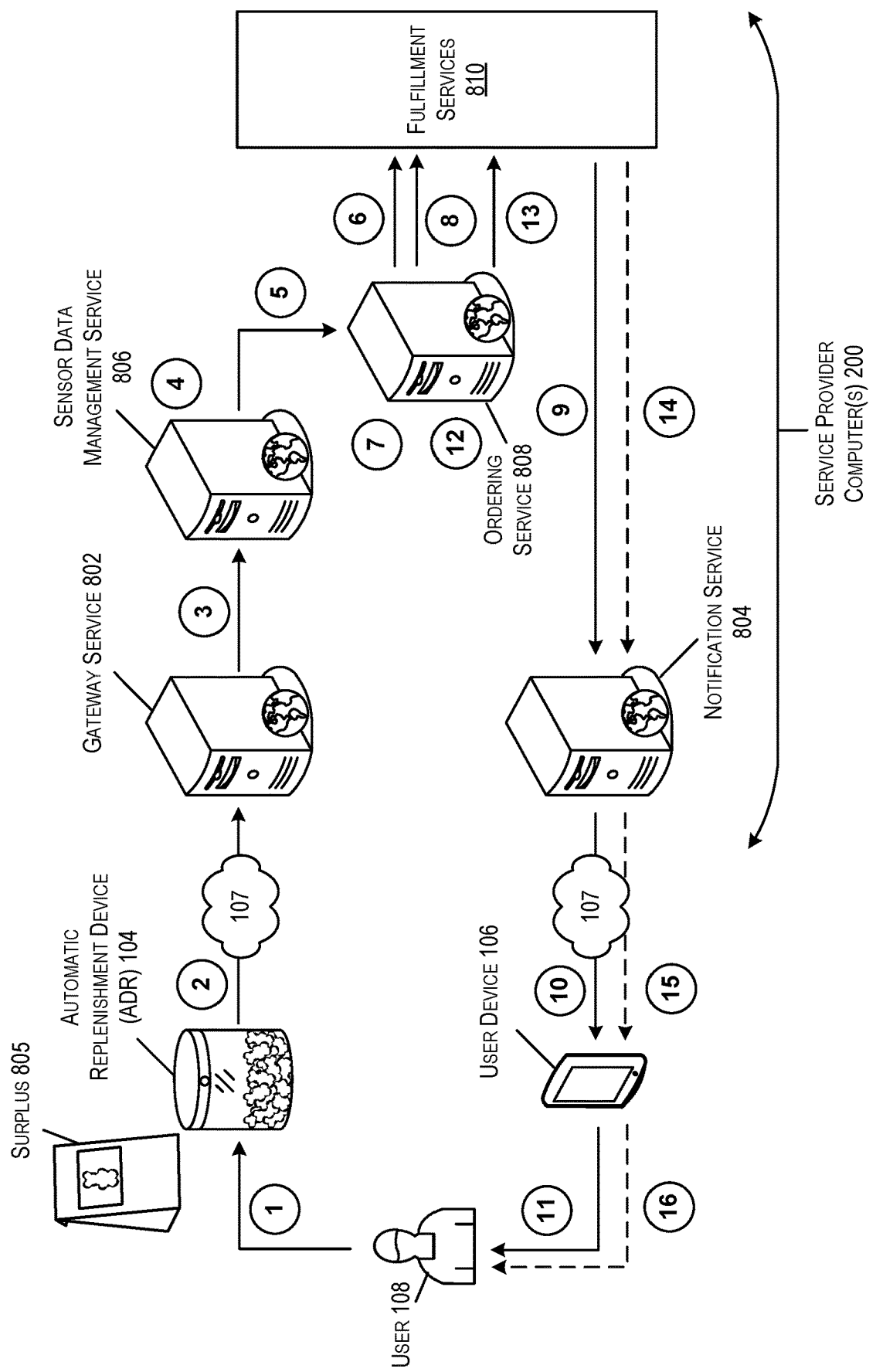
FIG. 8 illustrates a first example protocol for replenishing an item, in accordance with at least one embodiment.

FIG. 8 illustrates a first example protocol for replenishing an item, in accordance with at least one embodiment. The protocol 800 may be performed by the ARD 104 and user device 106 of FIG. 1 and service provider computers 501 of FIG. 5. It should be appreciated that the gateway service 802, the notification service 804, the sensor data management service 806, the ordering service 808, the fulfillment services 810 may be provided by the service provider computers 501 of FIG. 5. In some embodiments, the gateway service 802 and the notification service 804 may be provided as part of the input/output processing module 602 of FIG. 6, the sensor data management service 806 may be provided as part of the sensor data management engine 608 of FIG. 6, and the ordering service 808 may be provided as part of the ordering engine 610 of FIG. 6.

At step 1, the user 108 of FIG. 1 may fill the ARD with an item (e.g., gummi bears). The item may fill the ARD 104 entirely, or the item may only partially fill the ARD 104. In the example depicted in FIG. 7, a surplus 805 of the item exists (or potentially exists).

At step 2, the ARD 104 may provide sensor data via the network(s) 107 to the gateway service 802. The gateway service 802 may be configured to execute security protocols and routing protocols to ensure that the sensor data is being received from a trusted source and that the sensor data is routed to the appropriate service (e.g., the sensor data management service 806).

At step 3, the sensor data may be forward by the gateway service 802 to the sensor data management service 806. The sensor data management service 806 may be configured to provide the functionality described above in connection with the sensor data management engine 608 of FIG. 6.

At step 4, the sensor data management service 806 may be configured to calculate a current fill level. If the sensor data includes a distance measurement (e.g., the ARD 104 is an example of the ARD 200 of FIG. 2), the sensor data management service 806 may be configured to calculate a volume, weight, and/or amount/quantity of the item within/on the ARD 104 using the distance measurement (e.g., quantifying a distance between a sensor of the ARD 104 and the item within/on the ARD). If the sensor data includes a weight measurement (e.g., the ARD 104 is an example of the ARD 300 of FIG. 3), the sensor data management service 806 may be configured to calculate a volume, weight, and/or amount/quantity of the item within/on the ARD 104 using the weight measurement (e.g., an amount quantifying how much the item placed in/on the ARD 104 weighs).

At step 5, the sensor data management service 806 may publish the computed fill level to the ordering service 808. The ordering service 808 may determine whether or not there is a potential surplus of the item external to the ARD 104. For example, the ordering service 808 may be configured to retrieve/obtain item attributes associated with the item (e.g., from the fulfillment services 810) at step 6. The item attributes may include weight, package dimensions, a number of units, a size, a shape, a volume, a quantity, shipping package dimensions, or the like. Based on the item attributes, the ordering service 808 may calculate a minimum fill level/amount for the item. The ordering service 808 may be further configured to determine, based on the minimum fill level/amount of the item and the storage capacity (e.g., volume and/or weight) of the ARD 104, whether or not the item is entirely stored within/on the ARD 104. For example, if the minimum fill level/current amount of the item is equal to or less than the storage capacity associated with the ARD 104, then the ordering service 808 may identify that the item is fully stored within the ARD 104. In some examples, the ordering service 808 may store an indicator indicating that there is no surplus of the item. If the minimum fill level/current amount of the item is greater than the storage capacity associated with the ARD 104, then the ordering service 808 may identify that the item is fully stored within the ARD 104. In some examples, the ordering service 808 may store an indicator indicating that there is a surplus of the item.

In at least one embodiment, the ordering service 808 may be configured to utilize a current fill level/current amount of a previously-provided item when determining whether or not the item is entirely stored within or on the ARD 104. That is, the ordering service 808 can add the minimum fill level/amount required to store the item to the current fill level/current amount of the ARD 104 in order to determine that the item entirely fits in/on the ARD 104, or that there may be a surplus amount of the item external to the ARD 104. If the minimum fill level/current amount of the item plus the current fill level/current amount is less than or equal to the storage capacity associated with the ARD 104, then the ordering service 808 may identify that the item is fully stored within the ARD 104. In some examples, the ordering service 808 may store an indicator indicating that there is no surplus of the item. If the minimum fill level/current amount of the item is greater than the storage capacity associated with the ARD 104, then the ordering service 808 may identify that the item is fully stored within the ARD 104. In some examples, the ordering service 808 may store an indicator indicating that there is a surplus of the item.

At step 7, the ordering service 808 may compare the current fill level/current amount within/on the ARD 104 to a replenishment threshold. The ordering service 808 may also check whether an order for the item has already been placed. The ordering service 808 may additional check (e.g., via the indicator determined above) whether or not a surplus of the item exists (or potentially exists). If the current fill level/current amount within/on the ARD 104 is less than or equal to the replenishment threshold, and no other order for the item exists, and the item is associated with a surplus (e.g., the surplus 805, determinable via the indicator), the ordering service 808 may generate and automated order and/or start a delay timer at step 8. The timer may be set to expire at a predetermined time (e.g., at 30 minutes, at 15 minutes, at 1 day, etc.) and send a request to the fulfilment services 810.

At step 9, the fulfillment services 710 (or the ordering service 708), based at least in part on the timer being set, may request that a notification be sent to the user to remind the user to refill the ARD 104. The request may be transmitted to the notification service 704.

At step 10, the notification service 704 may transmit a notification (e.g., via an email, text message, website, application, push notification, or the like) via network(s) 107, to the user device 106 to remind the user 108 to refill the ARD 104. The user device 106 may present the notification to the user 108 at step 11.

At step 12, the ordering service 808 may determine the timer has expired. If the timer has expired and the user 108 has not refilled the ARD 104 (e.g., sensor data is not received at all, or the sensor data received does not indicate an increase in fill level and/or weight), then the ordering service 808 may transmit item information to the fulfillment services 810 at step 13 to process an automated order for the item (e.g., the automated order generated at step 8, a newly-generated order).

At step 14, the fulfillment services 810 (or the ordering service 808) may request that a notification of the order be sent to the user. The request may be transmitted to the notification service 804.

At step 15, the notification service 704 may transmit a notification (e.g., via an email, text message, website, application, push notification, or the like) via network(s) 107, to the user device 106. The user device 106 may present the notification to the user 108 at step 16. In some embodiments, the user 108 may be enabled to accept or reject the order. If rejection does not occur within a time period (e.g., 30 minutes) initiating the order, or the user affirmatively accepts the order, the order may proceed and the item may be reordered and eventually delivered to the customer. If the user 108 rejects the order, the rejection may be received by the ordering service 708 and/or the fulfillment services 710 and the order may be canceled.

Figure 9:
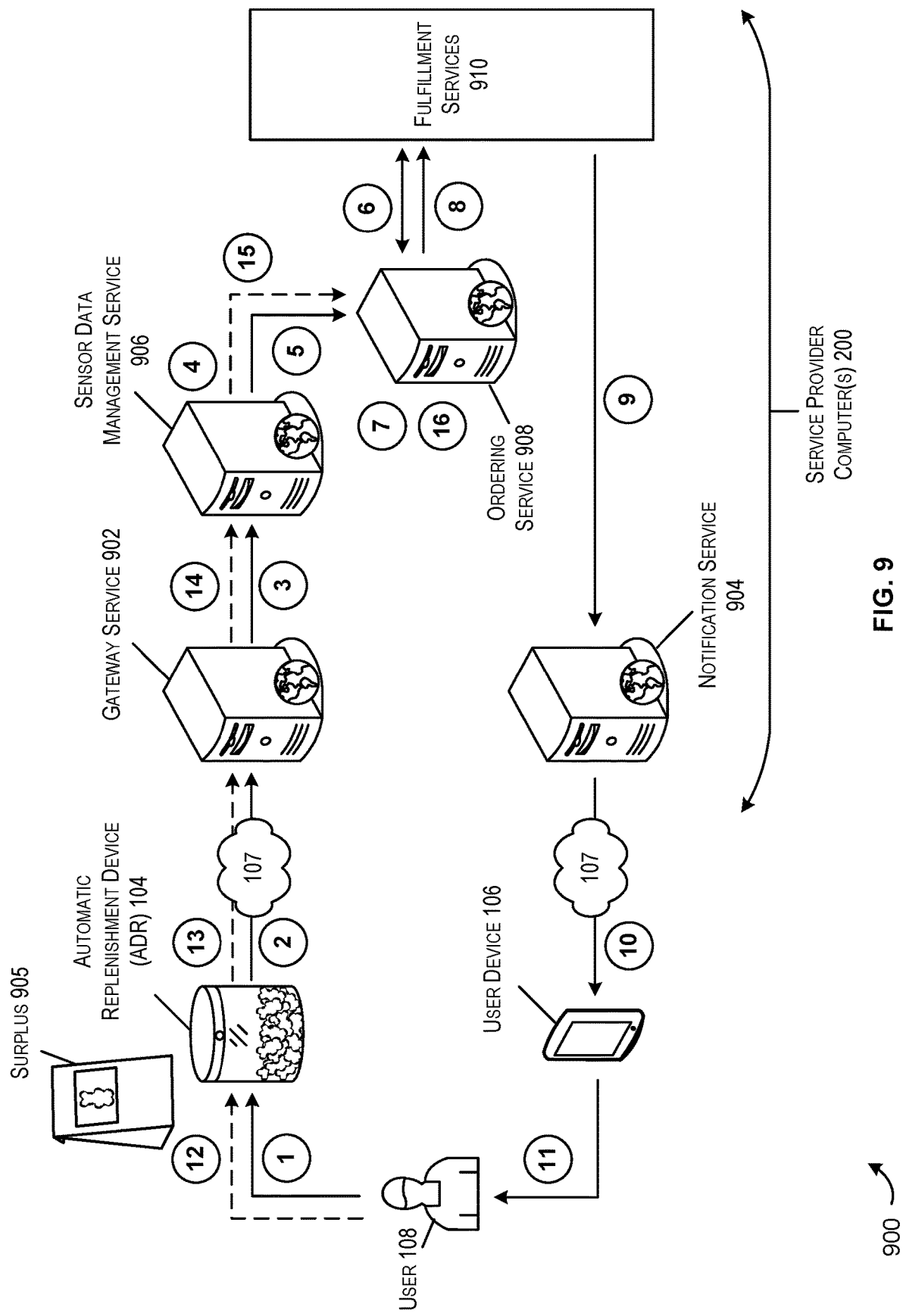
FIG. 9 illustrates a first example protocol for replenishing an item, in accordance with at least one embodiment.

FIG. 9 illustrates a first example protocol for replenishing an item, in accordance with at least one embodiment. The protocol 900 may be performed by the ARD 104 and user device 106 of FIG. 1 and service provider computers 501 of FIG. 5. It should be appreciated that the gateway service 902, the notification service 904, the sensor data management service 906, the ordering service 908, the fulfillment services 910 may be provided by the service provider computers 501 of FIG. 5. In some embodiments, the gateway service 902 and the notification service 904 may be provided as part of the input/output processing module 602 of FIG. 6, the sensor data management service 906 may be provided as part of the sensor data management engine 608 of FIG. 6, and the ordering service 908 may be provided as part of the ordering engine 610 of FIG. 6.

At step 1, the user 108 of FIG. 1 may fill the ARD 104 with an item (e.g., gummi bears). The item may fill the ARD 104 entirely, or the item may only partially fill the ARD 104. In the example depicted in FIG. 9, a surplus 905 of the item exists (or potentially exists).

At step 2, the ARD 104 may provide sensor data via the network(s) 107 to the gateway service 902. The gateway service 902 may be configured to execute security protocols and routing protocols to ensure that the sensor data is being received from a trusted source and that the sensor data is routed to the appropriate service (e.g., the sensor data management service 906).

At step 3, the sensor data may be forward by the gateway service 902 to the sensor data management service 906. The sensor data management service 906 may be configured to provide the functionality described above in connection with the sensor data management engine 608 of FIG. 6.

At step 4, the sensor data management service 906 may be configured to calculate a current fill level. If the sensor data includes a distance measurement (e.g., the ARD 104 is an example of the ARD 200 of FIG. 2), the sensor data management service 906 may be configured to calculate a volume, weight, and/or amount/quantity of the item within/ on the ARD 104 using the distance measurement (e.g., quantifying a distance between a sensor of the ARD 104 and the item within/on the ARD). If the sensor data includes a weight measurement (e.g., the ARD 104 is an example of the ARD 300 of FIG. 3), the sensor data management service 906 may be configured to calculate a volume, weight, and/or amount/quantity of the item within/on the ARD 104 using the weight measurement (e.g., an amount quantifying how much the item placed in/on the ARD 104 weighs).

At step 5, the sensor data management service 906 may publish the computed fill level to the ordering service 908. The ordering service 908 may determine whether or not there is a potential surplus of the item external to the ARD 104. For example, the ordering service 908 may be configured to retrieve/obtain item attributes associated with the item (e.g., from the fulfillment services 810, from a data store internal and/or accessible to the ordering service 908, etc.) at step 6. The item attributes may include weight, package dimensions, a number of units, a size, a shape, a volume, a quantity, shipping package dimensions, or the like. Based on the item attributes, the ordering service 908 may calculate a minimum fill level/amount for the item. The ordering service 908 may be further configured to determine, based on the minimum fill level/amount of the item and the storage capacity (e.g., volume and/or weight) of the ARD 104, whether or not the item is entirely stored within/on the ARD 104. For example, if the minimum fill level/current amount of the item is equal to or less than the storage capacity associated with the ARD 104, then the ordering service 908 may identify that the item is fully stored within the ARD 104. In some examples, the ordering service 908 may store an indicator indicating that there is no surplus of the item. If the minimum fill level/current amount of the item is greater than the storage capacity associated with the ARD 104, then the ordering service 908 may identify that the item is fully stored within the ARD 104. In some examples, the ordering service 908 may store an indicator indicating that there is a surplus of the item. In the example depicted in FIG. 9, the ordering service 908 may store an indicator that surplus 905 may exist (or may potentially exist).

In at least one embodiment, the ordering service 908 may be configured to utilize a current fill level/current amount of a previously-provided item when determining whether or not the item is entirely stored within or on the ARD 104. That is, the ordering service 908 can add the minimum fill level/amount required to store the item to the current fill level/current amount of the ARD 104 in order to determine that the item entirely fits in/on the ARD 104, or that there may be a surplus amount of the item external to the ARD 104. If the minimum fill level/current amount of the item plus the current fill level/current amount is less than or equal to the storage capacity associated with the ARD 104, then the ordering service 908 may identify that the item is fully stored within the ARD 104. In some examples, the ordering service 908 may store an indicator indicating that there is no surplus of the item. If the minimum fill level/current amount of the item is greater than the storage capacity associated with the ARD 104, then the ordering service 908 may identify that the item is fully stored within the ARD 104. In some examples, the ordering service 908 may store an indicator indicating that there is a surplus of the item. In the example depicted in FIG. 9, the ordering service 908 may store an indicator that surplus 905 may exist (or may potentially exist).

At step 7, the ordering service 908 may compare the current fill level/current amount within/on the ARD 104 to a replenishment threshold. The ordering service 908 may also check whether an order for the item has already been placed. The ordering service 908 may additional check (e.g., via the indicator determined above) whether or not a surplus of the item exists (or potentially exists). If the current fill level/current amount within/on the ARD 104 is less than or equal to the replenishment threshold, and no other order for the item exists, and the item is associated with a surplus (e.g., the surplus 805, determinable via the indicator), the ordering service 808 may generate an automated order and/or start a delay timer at step 8. The time may be set to expire at a predetermined time (e.g., at 30 minutes, at 15 minutes, at 1 day, etc.) and send a request to the fulfilment services 910.

At step 9, the fulfillment services 910 (or the ordering service 908), based at least in part on the timer being set, may request that a notification be sent to the user to remind the user to refill the ARD 104. The request may be transmitted to the notification service 904.

At step 10, the notification service 904 may transmit a notification (e.g., via an email, text message, website, application, push notification, or the like) via network(s) 107, to the user device 106 to remind the user 108 to refill the ARD 104. The user device 106 may present the notification to the user 108 at step 11.

In the example depicted in FIG. 9, the user 108 refills the ARD 104 and steps 12-15 may be performed. Steps 12-15 may be equivalent to steps 1-5 but with new sensor data indicating an increase in the current fill level/current amount of the item within/on the ARD 104.

At step 16, the ordering service 908 may determine that the current fill level/current amount has increased and as a result, the ordering service 908 may cancel the timer and forgoes further processing of the automated order for the item generated at step 8 (e.g., the automated order may be deleted).

Figure 10:
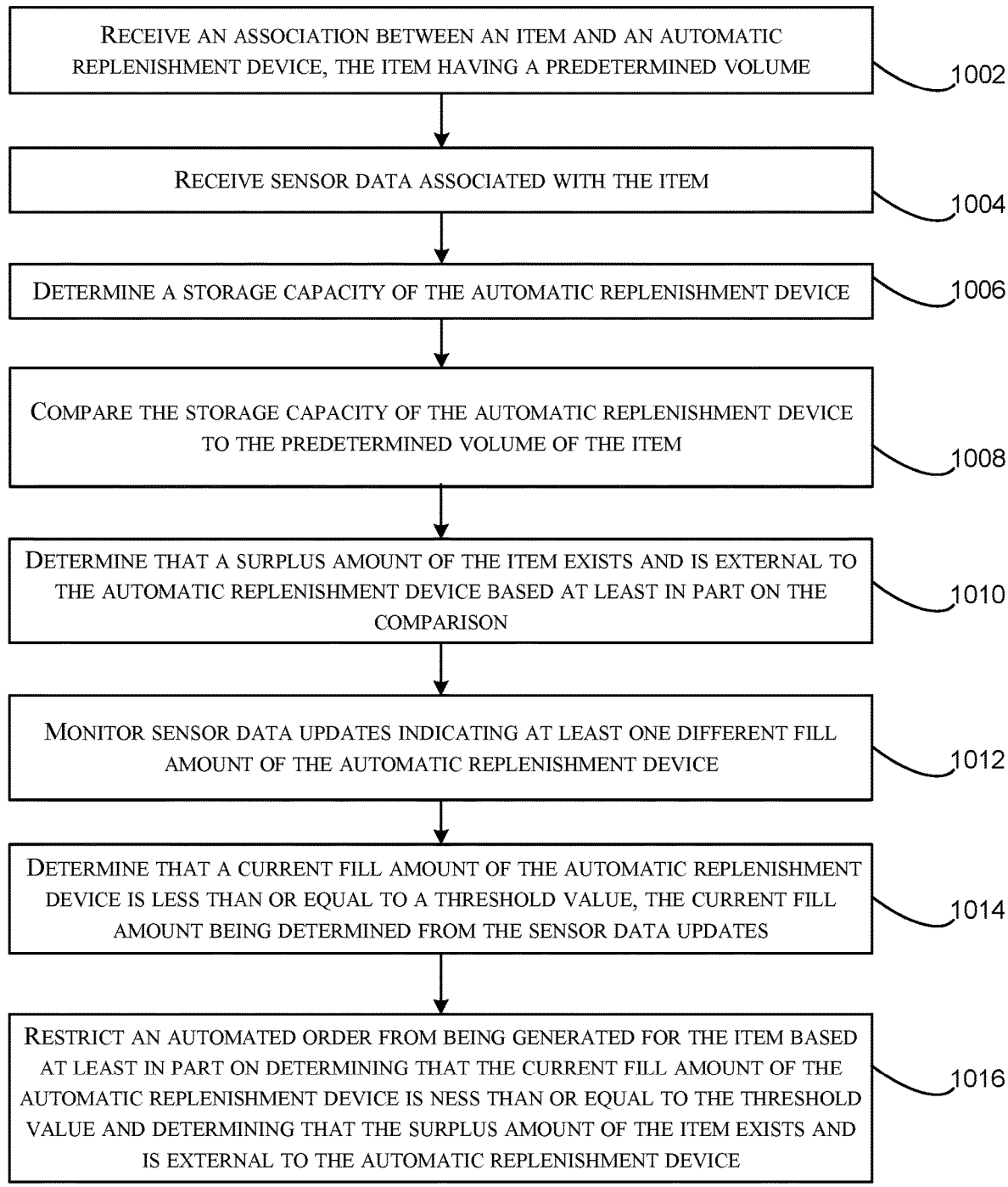
FIG. 10 illustrates a flow diagram of a method for determining replenishment decisions with respect to potential surplus amounts of an item, in accordance with at least one embodiment.

FIG. 10 illustrates a flow diagram of a method 1000 for determining replenishment decisions with respect to potential surplus amounts of an item, in accordance with at least one embodiment. The method 1000 may be performed by one or more components of the automatic replenishment engine 600 (e.g., one or more of the services of FIGS. 7-9). The method 1000 may performed in any suitable order. It should be appreciated that the method 1000 may include a greater number or a lesser number of steps than that depicted in FIG. 10.

The method may begin at 1002, where an association between an item and an automatic replenishment device (ARD) may be received by a computing device (e.g., the association engine 606 of FIG. 6). The association may be stored within a user profile maintained by service provider computers 501 of FIG. 5. The item may have a predetermined volume.

At 1004, sensor data associated with the item may be received by a computing device (e.g., the sensor data management engine 608 of FIG. 6). In some embodiments, the item may fill the automatic replenishment device to an initial fill amount (e.g., 60%).

At 1006, a storage capacity of the automatic replenishment device may be determined (e.g., by the ordering engine 610 of FIG. 6).

At 1008, the storage capacity of the automatic replenishment device may be compared (e.g., by the ordering engine 610) to the predetermined volume of the item.

At 1010, it may be determined (e.g., by the ordering engine 610 and/or the sensor data management engine 608) that a surplus amount of the item exists (or potentially exists)

and is external to the automatic replenishment device based at least in part on the comparison between the storage capacity of the automatic replenishment device and the predetermined volume of the item.

At 1012, sensor data updates may be monitored (e.g., by the sensor data management engine 608. The sensor data update may indicate at least one different fill amount of the automatic replenishment device.

At 1014, a computing device (e.g., the ordering engine 610) may determine that a current fill amount of the automatic replenishment device is less than or equal to a threshold value, the current fill amount being determined from the sensor data updates (by the sensor data management engine 608).

At 1016, an automated order may be restricted (e.g., by the ordering engine 610) from being generated for the item based at least in part on determining that the current fill amount of the automatic replenishment device is less than or equal to the threshold value and determining that the surplus amount of the item exists (or potentially exists) and is external to the automatic replenishment device.

Figure 11:
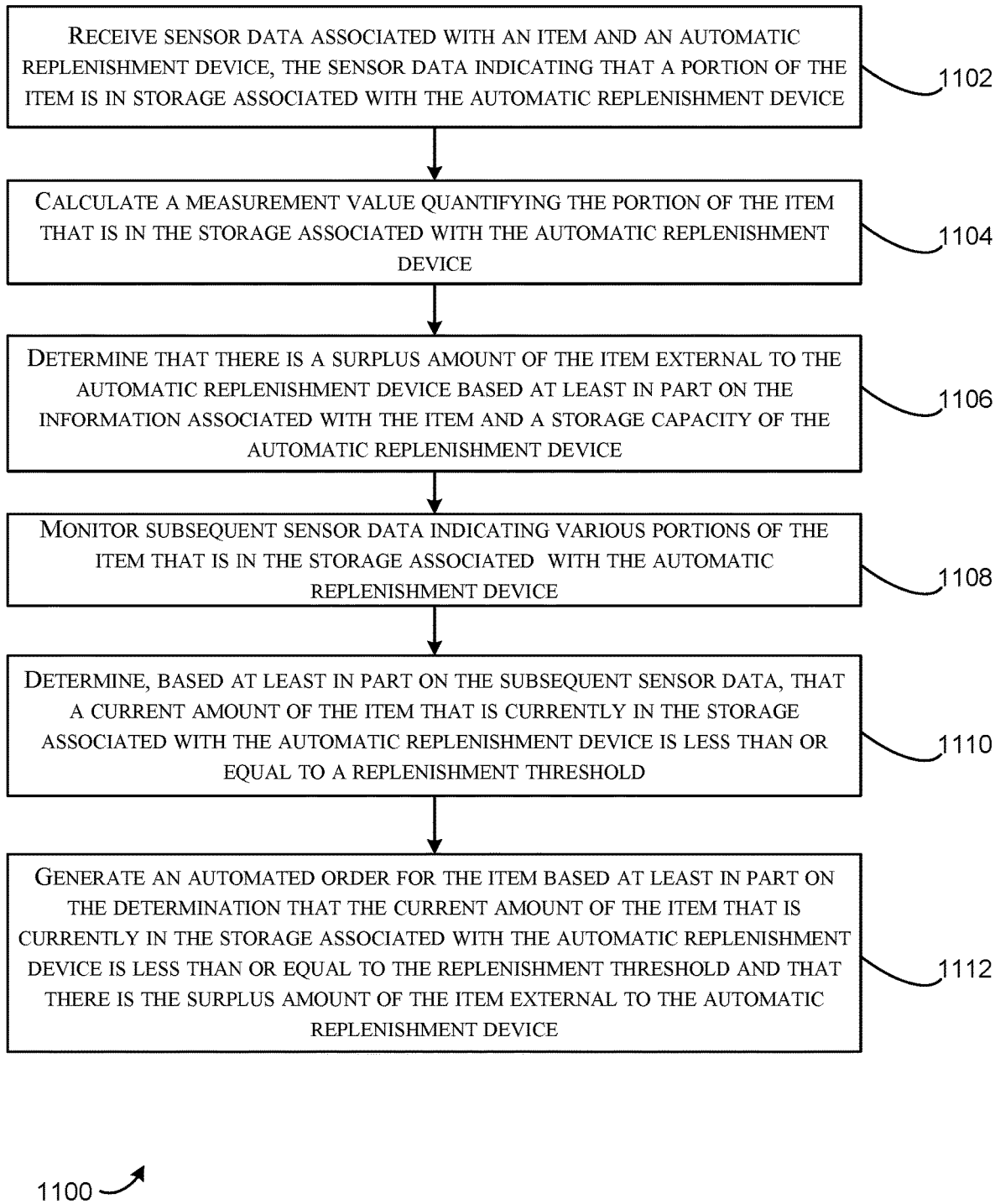
FIG. 11 illustrates a flow diagram of another method for determining replenishment decisions with respect to potential surplus amounts of an item, in accordance with at least one embodiment.

FIG. 11 illustrates a flow diagram of another method 1100 for determining replenishment decisions with respect to potential surplus amounts of an item, in accordance with at least one embodiment. The method 1100 may be performed by one or more components of the automatic replenishment engine 600 (e.g., one or more of the services of FIGS. 7-9). The method 1100 may performed in any suitable order. It should be appreciated that the method 1100 may include a greater number or a lesser number of steps than that depicted in FIG. 11. In some embodiments, the method 1100 may be performed by a system comprising a processor and a memory that stores computer-readable instructions that, upon execution by the processor, configure the system to perform the method 1100. In some embodiments, a computer-readable storage medium may comprise computer-readable instructions that, upon execution by a computer system, configure the computer system to perform operations comprising the method 1100.

The method may begin at 1102, where sensor data associated with an item and an automatic replenishment device (ARD) may be received (e.g., by the sensor data management engine 608 of FIG. 6). In some embodiments, the sensor data may indicate (e.g., by a distance and/or weight measurement) that a portion of the item is in storage associated with the automatic replenishment device.

At 1104, a measurement value quantifying the portion of the item that is in the storage associated with the automatic replenishment device may be calculated (e.g., by the sensor data management engine 608).

At 1106, it may be determined (e.g., by the sensor data management engine 608 or the ordering engine 610 of FIG. 6) that there is a surplus amount of the item external to the automatic replenishment device. Such a determination may be based at least in part on the information associated with the item and a storage capacity of the automatic replenishment device.

At 1108, subsequent sensor data may be monitored (e.g., by the sensor data management engine 608). The subsequent sensor data may indicate various portions of the item that is in the storage associated with the automatic replenishment device.

At 1110, it may be determined (e.g., by the ordering engine 610), based at least in part on the subsequent sensor data, that a current amount of the item that is currently in the storage associated with the automatic replenishment device is less than or equal to a replenishment threshold.

At 1112, an automated order for the item may be generated (e.g., by the ordering engine 610) based at least in part on the determination that the current amount of the item that is currently in the storage associated with the automatic replenishment device is less than or equal to the replenishment threshold and that the surplus amount of the item is external to the automatic replenishment device.

Figure 12:
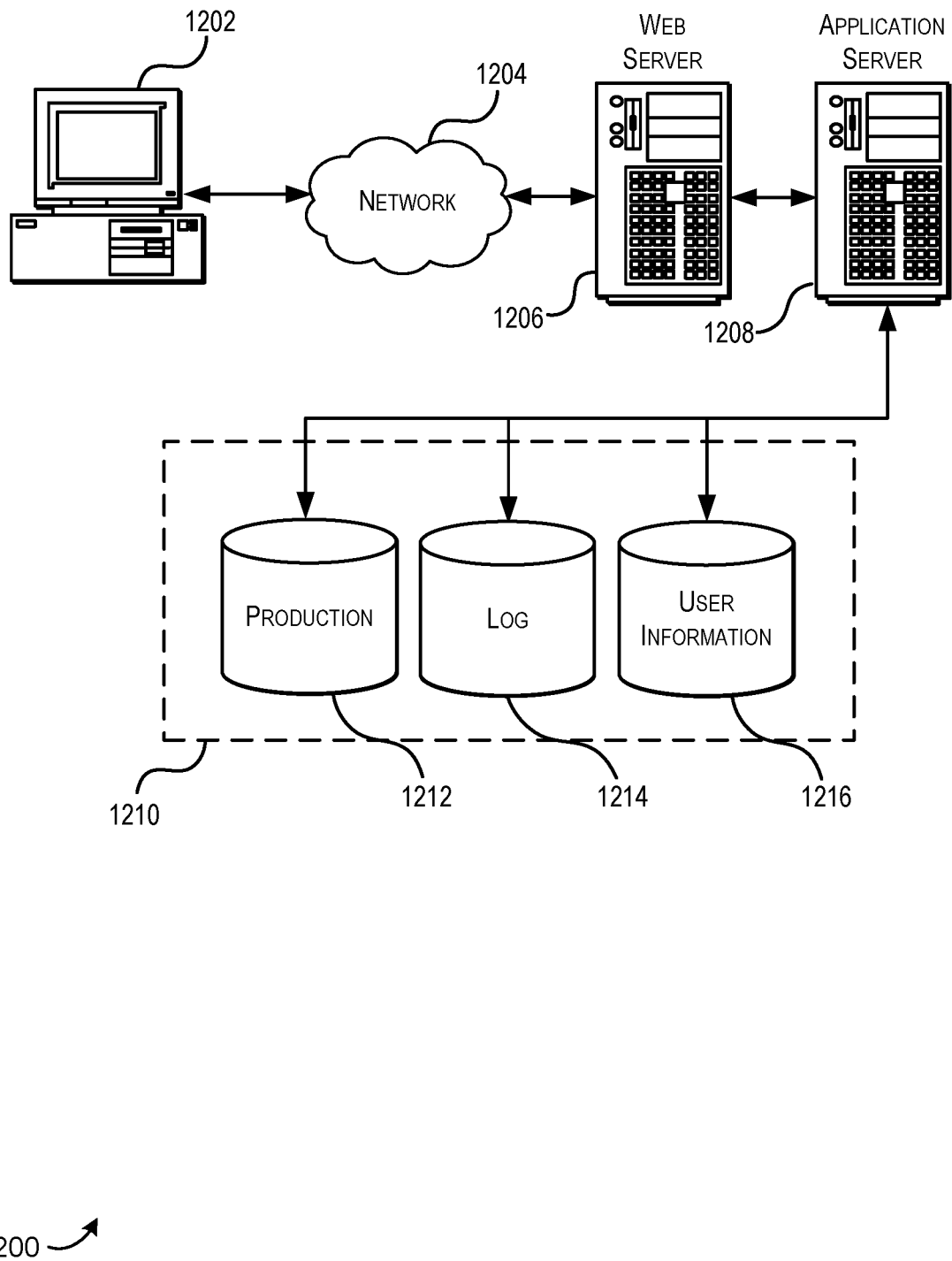
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 916, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a computing device from a service provider system, an association between an item and an automatic replenishment device (ARD), the item having a predetermined volume;
receiving, by the computing device, sensor data associated with the item;
determining, by the computing device, a storage capacity of the ARD;
comparing, by the computing device, the storage capacity of the ARD to the predetermined volume;
determining that a surplus amount of the item exists and is external to the ARD based at least in part on comparing the storage capacity of the ARD to the predetermined volume;
monitoring, by the computing device, sensor data updates indicating at least one different fill amount of the ARD;
determining, by the computing device, that a fill amount of the ARD is less than or equal to a threshold value, the fill amount being determined from the sensor data updates;
in response to determining that the fill amount of the ARD is less than or equal to the threshold value and that the surplus amount of the item exists, generating, by the computing device, a timer that upon expiration causes an automated order for the item to be transmitted;
monitoring, by the computing devices, subsequent sensor data updates indicating one or more subsequent fill amounts of the ARD;
in response to determining that a second fill amount of the one or more subsequent fill amounts of the ARD is greater than the fill amount cancelling, by the computing device, the timer, wherein canceling the timer restricts the automated order from being generated for the item and reduces a subsequent processing burden of the service provider system.

2. The computer-implemented method of claim 1, further comprising:
calculating, by the computing device, the surplus amount based at least in part on the predetermined volume and a volume of the item needed to fill the ARD to the fill amount; and
determining, based at least in part on the sensor data updates, that the surplus amount has been added to the ARD.

3. The computer-implemented method of claim 1, further comprising generating, by the computing device, the automated order for the item based at least in part on determining that the fill amount of the ARD is less than or equal to the threshold value and the determination that the surplus amount has been added to the ARD.

4. A computing device, comprising:
a processor; and
a memory storing computer-readable instructions that, upon execution by the processor, cause the computing device to:
receive sensor data associated with an item and an automatic replenishment device (ARD), the sensor data indicating that a portion of the item is in storage associated with the ARD;
calculate a measurement value quantifying the portion of the item that is in the storage associated with the ARD;
determine that a surplus amount of the item exists and is external to the ARD based at least in part on information associated with the item and a storage capacity of the ARD;
monitor subsequent sensor data indicating various portions of the item that is in the storage associated with the ARD;
determine, based at least in part on the subsequent sensor data, that a first amount of the item that is currently in the storage associated with the ARD is less than or equal to a replenishment threshold;
in response to determining that the first amount of the item currently in the storage is less than or equal to the replenishment threshold and that the surplus amount of the item exists, generate a timer that upon expiration causes an automated order for the item to be transmitted;
monitor subsequent sensor data updates indicating one or more subsequent amounts of the item in the ARD; and
in response to determining that a second amount of the one or more subsequent amounts is greater than the first amount, cancel the timer, wherein canceling the timer restricts the automated order from being generated for the item and reduces a subsequent processing burden of a system that provided the item.

5. The computing device of claim 4, wherein the ARD is at least one of a container that is configured to contain a volume of the item or a device that is configured to receive a number of units of the item placed upon it.

6. The computing device of claim 4, wherein the sensor data comprises at least one of a volume associated with an amount of the item that is placed within the ARD or a weight associated the amount of the item that is placed upon the ARD.

7. The computing device of claim 6, wherein the computer-readable instructions, upon execution by the processor, further cause the computing device to:
maintain a running total amount of the item that has been used based at least in part on the sensor data and the monitoring;
identify an initial amount associated with the item; and
determine a combined amount of the running total amount of the item that has been used and the first amount of the item that is currently in the storage associated with the ARD, wherein the automated order is based at least in part on determining that the combined amount exceeds the initial amount associated with the item.

8. The computing device of claim 6, wherein the sensor data provides at least one of a distance measurement between a first sensor of the ARD and the item, or a weight measurement of the item by a second sensor of the ARD, wherein the ARD comprises at least one of the first sensor or the second sensor.

9. The computing device of claim 4, wherein the computer-readable instructions, upon execution by the processor, further cause the computing device to:
cause presentation of information related to the automated order on a client device;
receive indication that the automated order is rejected, the indication being initiated from the client device; and
cancel the timer related based at least in part on the indication that the automated order is rejected.

10. A computer-readable storage medium comprising computer-readable instructions that, upon execution by a computer system, configure the computer system to perform operations comprising:
receiving sensor data associated with an item and an automatic replenishment device (ARD), the sensor data indicating that an initial amount of the item that is stored at the ARD;
calculating a measurement value quantifying the initial amount of the item that is stored at the ARD;
monitoring subsequent sensor data indicating subsequent amounts over time of the item stored at the ARD;
determining, based at least in part on the measurement value and the monitoring, that a surplus amount of the item potentially exists that is external to the ARD;
in response to determining that a current amount of the item stored in the ARD is less than or equal to a threshold value and that the surplus amount of the item exists, generating a timer that upon expiration causes an automated order for the item to be transmitted;
in response to determining that a second amount corresponding to one of the subsequent amounts is greater than the initial amount, cancel, by the computer system, the timer, wherein canceling the timer restricts the automated order from being generated for the item and reduces a subsequent processing burden of a system that provided the item.

11. The computer-readable storage medium of claim 10, wherein the computer-readable instructions, upon execution by a computer system, further configure the computer system to perform operations comprising providing, to a client device, the current amount of the item that is stored at the ARD based at least in part on the measurement value and the monitoring.

12. The computer-readable storage medium of claim 10, wherein the current amount is expressed in units of the item.

13. The computer-readable storage medium of claim 10, the computer-readable instructions, upon execution by a computer system, further configure the computer system to perform operations comprising:
 providing, to a client device, a notification to refill the item stored at the ARD.

14. The computer-readable storage medium of claim 10, the computer-readable instructions, upon execution by a computer system, further configure the computer system to perform operations comprising:
 providing a notification of the timer associated with generating the automated order, the notification being provided to a client device;
 receiving a response to the notification from the client device, the response indicating that the automated order is to be generated;
 deleting the timer based at least in part on the response; and
 generating the automated order based at least in part on the response.

15. The computer-readable storage medium of claim 14, wherein the item is packaged as having a plurality of item units, and wherein the plurality of item units exceed a volume capacity or a weight capacity of the ARD.

16. The computer-readable storage medium of claim 10, wherein the sensor data is generated by a time-of-flight sensor associated with the ARD.

17. The computer-readable storage medium of claim 10, the computer-readable instructions, upon execution by a computer system, further configure the computer system to perform operations comprising receiving, from a client device, an association between the item and the ARD.

\* \* \* \* \*

UNITED STATES PATENT AND TRADEMARK OFFICE
CERTIFICATE OF CORRECTION

PATENT NO. : 10,909,610 B1
APPLICATION NO. : 15/927946
DATED : February 2, 2021
INVENTOR(S) : Kramer et al.

Page 1 of 1

It is certified that error appears in the above-identified patent and that said Letters Patent is hereby corrected as shown below:

On the Title Page

Item (72), inventors, should read:
Allison Kramer, Seattle, WA (US);
Kara Lillian Cavallaro, Seattle, WA (US);
Samuel Stevens Heyworth, Seattle, WA (US);
Devon Merritt, Seattle, WA (US);
Amirali Virani, Bellevue, WA (US);
Hannah McClellan Richards, Boise, ID (US)

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*